United States Patent [19]
Tsiklauri et al.

[11] Patent Number: 5,793,831
[45] Date of Patent: *Aug. 11, 1998

[54] METHOD AND APPARATUS FOR IMPROVING THE PERFORMANCE OF A STEAM DRIVEN POWER SYSTEM BY STEAM MIXING

[75] Inventors: Georgi V. Tsiklauri, Richland; Bruce M. Durst, Kennewick; Andrew W. Prichard, Richland; Bruce D. Reid, Pasco, all of Wash.; James Burritt, Virginia Beach, Va.

[73] Assignee: Battelle Memorial Institute, Richland, Wash.

[*] Notice: The term of this patent shall not extend beyond the expiration date of Pat. No. 5,526,386.

[21] Appl. No.: 662,729

[22] Filed: Jun. 10, 1996

Related U.S. Application Data

[63] Continuation-in-part of Ser. No. 392,659, Feb. 23, 1995, Pat. No. 5,526,386, which is a continuation-in-part of Ser. No. 249,786, May 25, 1994, Pat. No. 5,457,721.

[51] Int. Cl.$^6$ .................................................. G21D 1/00
[52] U.S. Cl. ........................... 379/317; 60/653; 137/888; 137/896; 239/8; 239/427.3; 366/167.1
[58] Field of Search .................................. 376/317, 378, 376/391, 402; 60/644.1, 648, 653; 137/890, 896, 888; 239/427.3, 8; 366/167.1, 178.2

[56] References Cited

U.S. PATENT DOCUMENTS

| | | | |
|---|---|---|---|
| 3,332,442 | 7/1967 | Reed | 137/896 |
| 4,352,270 | 10/1982 | Silvestri, Jr. | 60/653 |
| 4,406,610 | 9/1983 | Duijvestijn | 239/400 |
| 4,616,678 | 10/1986 | Hoshi | 137/888 |
| 5,361,377 | 11/1994 | Miller | 376/211 |

Primary Examiner—Daniel D. Wasil
Attorney, Agent, or Firm—Paul W. Zimmerman

[57] ABSTRACT

A method and apparatus for improving the efficiency and performance of a steam driven power plant wherein addition of steam handling equipment to an existing plant results in a surprising increase in plant performance. For Example, a gas turbine electrical generation system with heat recovery boiler may be installed along with a micro-jet high pressure and a low pressure mixer superheater. Depending upon plant characteristics, the existing moisture separator reheater (MSR) can be either augmented or done away with. The instant invention enables a reduction in $T_{hot}$ without a derating of the reactor unit, and improves efficiency of the plant's electrical conversion cycle. Coupled with this advantage is a possible extension of the plant's fuel cycle length due to an increased electrical conversion efficiency. The reduction in $T_{hot}$ further allows for a surprising extension of steam generator life. An additional advantage is the reduction in erosion/corrosion of secondary system components including turbine blades and diaphragms. The gas turbine generator used in the instant invention can also replace or augment existing peak or emergency power needs. Another benefit of the instant invention is the extension of plant life and the reduction of downtime due to refueling.

25 Claims, 16 Drawing Sheets

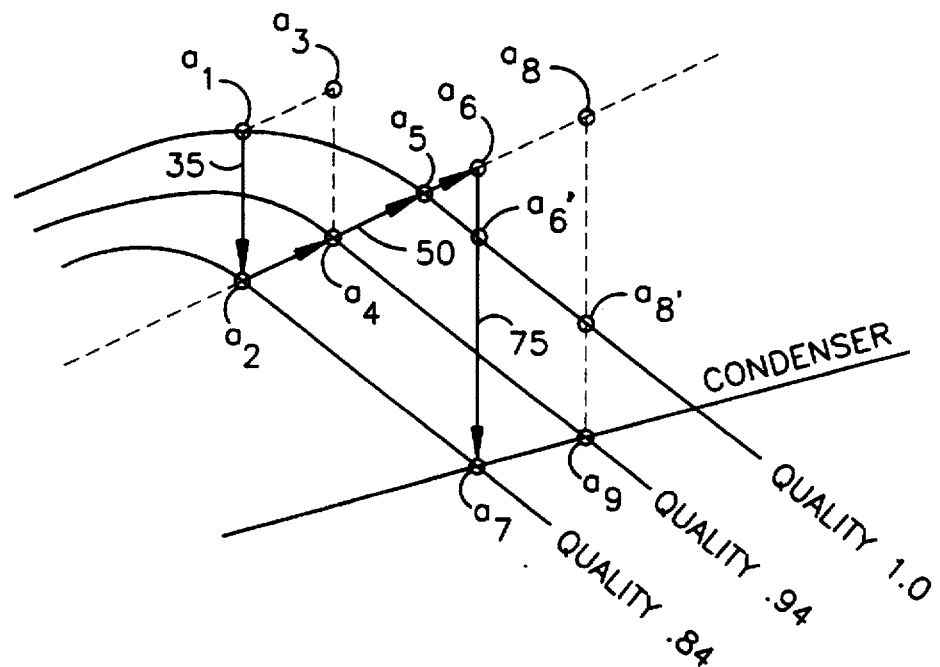
FIG    9a (PRIOR ART)
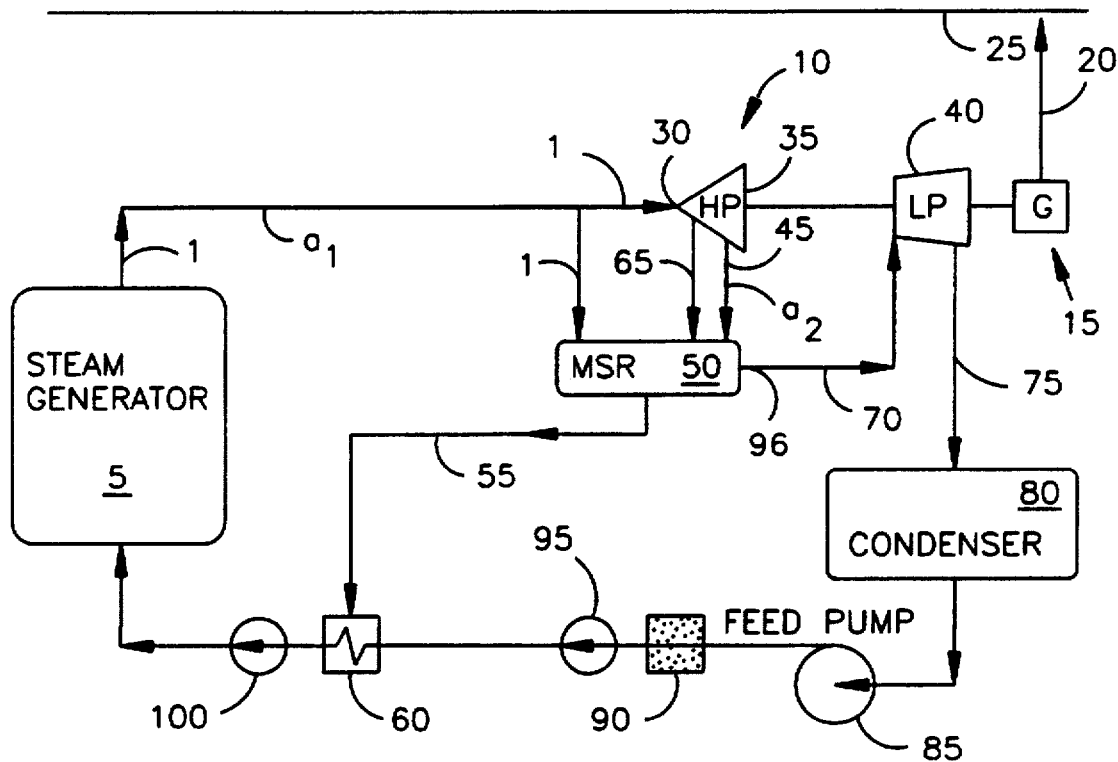
FIG    1 (PRIOR ART)

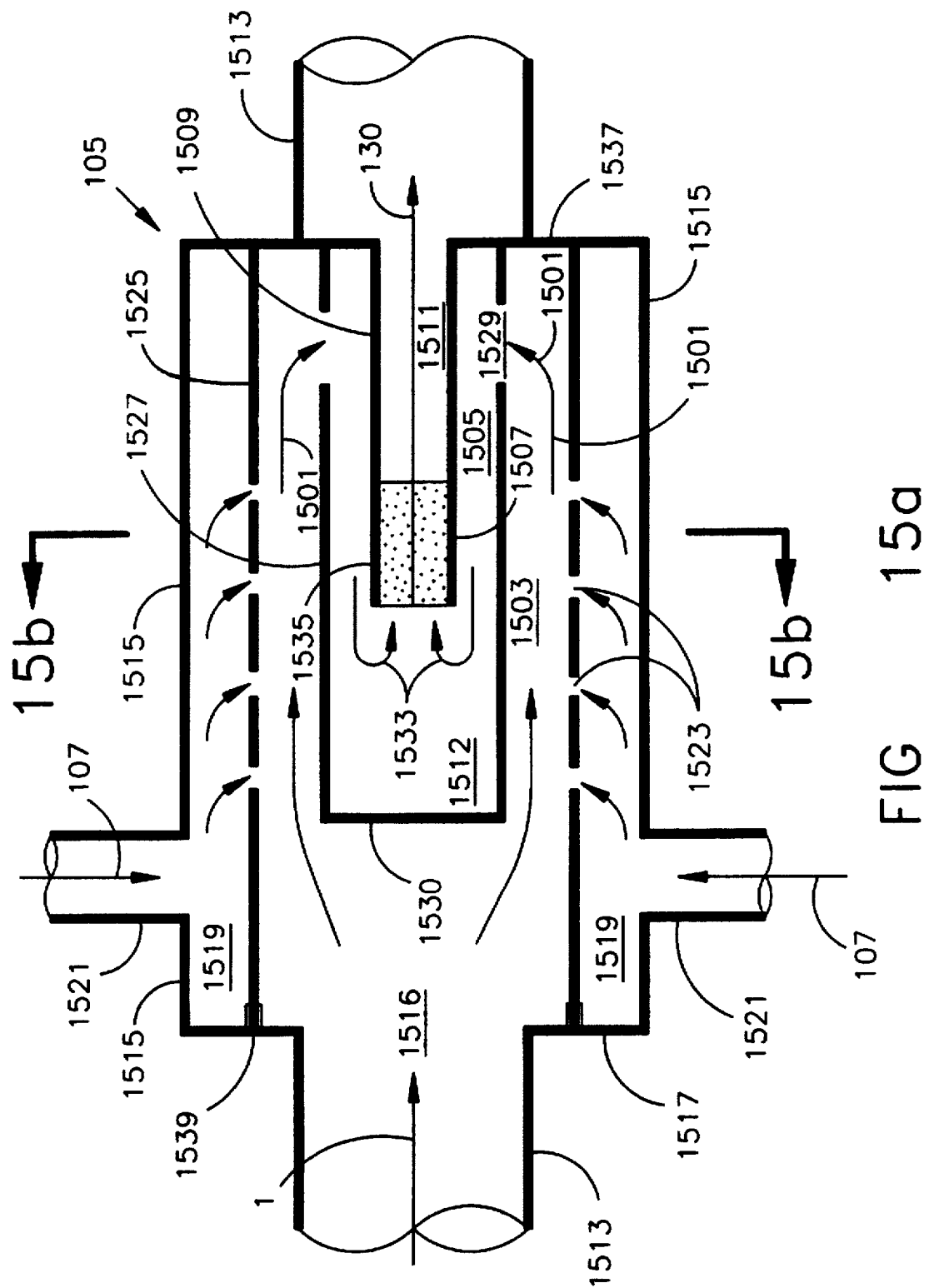

METHOD AND APPARATUS FOR IMPROVING THE PERFORMANCE OF A STEAM DRIVEN POWER SYSTEM BY STEAM MIXING

This application is a Continuation-in-part of application Ser. No. 08/392,659, filed Feb. 23, 1995, now U.S. Pat. No. 5,526,386, issued Jun. 11, 1996, which is a continuation-in-part of application Ser. No. 08/249,786, filed May 25, 1994, now U.S. Pat. No. 5,457,721, issued Oct. 10, 1995

FIELD OF THE INVENTION

The present invention generally relates to a method and apparatus for improving the performance of a steam driven power system by steam mixing. More specifically, the present invention is a method and apparatus for mixing a stream of low quality steam with a stream of higher quality steam and using the mixed steam to drive a turbine.

BACKGROUND OF THE INVENTION

Mixing of low quality or moist or wet steam with high quality steam has generally been avoided in commercial practice for several reasons. Thermodynamically, mixing degrades the entropy of the high quality steam. Mechanically, when high quality, high temperature steam is added to a low quality lower temperature steam, the streams are not immediately homogenous thereby creating random hot and cold spots in piping that damages the piping from non-uniform expansion and contraction. However, in commercial processes that utilize low quality steam, there are opportunities to improve thermodynamic efficiency of the commercial processes as well as mitigate corrosion and maintenance problems by adding high quality steam to the low quality steam.

One of the commercial opportunities is in the field of power systems with low quality steam, including but not limited to direct steam drive, for example water craft propulsion, and electric power generation, for example nuclear power plants, solar power plants, fossil power plants, and geothermal power plants.

In the operation of nuclear power plants, there are several important problems that significantly increase the cost of operations and maintenance. Some of these significant problems are: inherently low thermal efficiency, erosion-corrosion fuel storage and waste disposal limitations, equipment maintainability and reliability concerns as well as the limited fuel availability and the expensive requirements of storing spent fuel.

Various approaches have been tried to solve these problems separately, but few of the existing methods attack more than one of these concerns at a time.

Currently, in nuclear power plants (both pressurized water reactors or boiling water reactors), steam at the inlet of the turbine is saturated. This results in lower turbine efficiency and intensive erosion-corrosion problems.

Nuclear power electrical generation plants have a tremendous potential to produce energy. However, these plants have technical problems that prevent them from reaching their full energy production and from lasting to the end of their design lifetime. These include corrosion due to the high temperatures that they must operate at, and erosion of turbine and secondary system components to name a few. The instant invention enables the lowering of primary $T_{hot}$ temperature, steam generator temperature, and the increasing of steam quality that greatly reduces erosion of piping and components as well as turbine blades and diaphragms.

EXISTING STEAM PERFORMANCE

Referring to FIG. 1, the typical nuclear power electric generation system that utilizes a light water reactor will typically operate with wet main steam 1. Wet main steam 1 for this type of system, including both pressurized water reactors and boiling water reactors, is typically supplied by a steam generator 5 to drive the main turbine 10 that is the mechanical force to operate an electrical generator 15. Electrical power 20 generated by these systems is supplied to a grid 25 that purchases the electrical power 20.

Wet main steam 1 arriving at the main turbine 10 produces moisture problems such as corrosion and erosion of the turbine blades and diaphragms that limit plant life and are extremely costly in down time, replacement, and operational limitations. Main steam 1 at the entrance 30 to the main turbine 10 will typically be from 0.2% in moisture and be from 970 to 1030 psig (68 bar to 72 bar). The main turbine 10 typically consists of two stages, the high pressure (HP) 35 stage and the low stage (LP) Stage 40. After work is extracted from main steam 1 in the HP stage 35 the characteristics of the HP exhaust steam 45 must be enhanced to improve utilization of steam by the LP stage 40.

Currently, nearly all the nuclear power plant turbines, operating on wet main steam 1, whose expansion starts from the saturation curve (quality 1.0), are equipped with moisture separator reheaters (MSR) 50. Without MSRs 50 the HP exhaust steam 45 leaving the HP stage 35 may contain up to 25% of water (quality less 75%) that is too damaging for operation because of the erosion and corrosion. The MSR 50 not only improves the turbine 10 reliability (reduce the erosion of blades, housings, and diaphragms), but also improves efficiency of low pressure (LP) stage 40 of steam turbine 10 as much as 2 to 4%.

The construction of the MSR 50 is not critical to the instant invention and is well known in the art. FIG. 2 illustrates the typical construction of a MSR 50. Now referring to FIG. 2, moisture 55 that is typically removed by chevron separating elements 57 from the HP exhaust steam 45 is returned to the feed system through a reheater 60. After the chevron separating elements 57 the HP exhaust steam 45, it is heated by at least one set of tube bundles 58,59. Most MSRs 50 in service today have two sets of tube bundles 58 and 59, and HP exhaust steam 45 enters on the bottom in dual inlet portals 61 and 63, and exits the top of the MSR 50 through dual exit portals 67 and 69.

Once the moisture 55 is separated from the HP exhaust steam 45 it is first heated by using extraction steam 65, then it is heated by main steam 1 with a set of tube bundles 59, and is then heated by tube bundle 58 that is supplied with main steam 1.

Extraction steam 65 is then directed from the MSR 50 as MSR exhaust steam 70 and is then sent to the LP stage 40 of the main turbine 10, and is slightly superheated, and is typically from 85 to 185 psig (6 to 13 bar). The MSRs 50, one of the most unreliable components in the entire generation system, are extremely expensive, and are usually one-third the cost of the main turbine 10 itself.

Also shown in FIG. 1 are other components that are typically found in light water nuclear reactor power generation systems. For example, turbine exhaust will proceed through the plenum 75 that connects the main turbine 10 and the condenser 80, to feed pump 85, to demineralizer 90, and then finally to pumping stages, 95 and 100, before being returned to the steam generator 5. Nuclear-electric generating systems of this type typically have an efficiency of about 33 to 35% with a heat rate of about 10,000 Btu/Kwh.

Existing combined-cycle-electric plants currently utilize a heat recovery boiler 110 (HRB) to increase the efficiency. FIG. 3 illustrates how an HRB 110 would be utilized in a typical combined-cycle-electric plant.

USE OF HRB IN CONVENTIONAL APPLICATIONS

Use of a HRB 110 in a conventional combined-cycle plant, is illustrated in FIG. 3 and is well known in the art. The cycle starts with water 115 that is returned to HRB 110 from the condenser 80 by the discharge of the feed pump 85 where it is heated by the exhaust 120 from a gas turbine 125. The fuel utilized by the gas turbine is not germane to the invention.

The exhaust gas 120 from the gas turbine 125 arrives to heat recovery boiler (HRB) 110, where two pressures of steam are generated and then superheated. High pressure and high enthalpy, HRB high pressure steam 107 is generated in high pressure loop 109; the HRB low pressure steam 145 is generated in low pressure loop 108. The construction of HRB 110 is not critical to the present invention and is well known in the art.

The gas turbine consists typically of several components: gas turbines 160, compressors 165, and burners 170. Operation of gas turbines is well known in the art. The gas turbine 125 is used to drive a generator 155 that supplies electricity 157 to the grid 25. This increases the overall plant efficiency to about 42 to 45% when the heat range is from 8200 to 7600 Btu/Kwh.

There have been several attempts to use single or multiple fossil reheaters to treat the steam of a operating nuclear power plant. However, while higher steam temperatures due to fossil heating between the low pressure turbine stage and the high pressure turbine stage have been achieved, higher efficiency still has not been demonstrated. One such attempt is U.S. Pat. No. 5,361,377 to John A. Miller. The Miller heat exchanger method and apparatus of treating the steam claims an increase in efficiency by use of a fossil fired reheater. A problem with this method is that the fossil reheater still consumes fuel in a process that is inefficient in itself. In other words a big part of the heat from the burning of the fossil fuel goes up the stack. A process is needed that produces electricity, and utilizes the waste heat from that process to treat the steam in an efficient manner.

U.S. Pat. No. 3,332,442 to Robert D. Reed shows a tubular fluid mixer for mixing liquids or gases for providing fuel or process conversion to useful products.

SUMMARY OF THE INVENTION

It is an object of the present invention to provide a method and apparatus for mixing a low quality steam with high quality steam. Commercial uses in the field of power systems with low quality steam, include but are not limited to direct steam drive, for example water craft propulsion, and electric power generation, for example nuclear power plants, solar power plants, fossil power plants, and geothermal power plants.

It is a further object of this invention to provide a means to improve the efficiency, availability, safety, and steam mixing, and economy of power generation systems utilizing low quality steam. And more particularly an improved means for providing superheated steam to the steam turbine driving the electrical generator.

It is a more particular object of the invention to allow for lower hot leg temperatures ($T_{hot}$) in the primary cycle of an existing power plant. The lower $T_{hot}$ would reduce the rate of erosion-corrosion and extend the lifetime of steam generators.

It is a further object of the invention to extend plant life by enabling the delivery of the same amount of electricity for a smaller amount of heat generated by nuclear reaction. In other words, the invention is useful in a combined nuclear-gas turbine cycle that can be used to, inter alia, reduce corrosion damage to the nuclear steam generator by operating the outlet reactor hot leg temperature below the critical corrosion temperature. Corrosion is significantly reduced by operating steam generators at less than 600° F. (315° C.). With the instant invention nuclear power plants can operate below 600° F. (315° C.) without derating the electrical output of the station. The advantage of reduced corrosion is due to reduced steam generator temperature caused by an increased thermal efficiency of the resulting steam cycle.

One factor that causes an increase in efficiency is that the additional electrical output from the gas turbines further adds to the electrical grid output of the station. In the instance where the hot leg temperature is reduced below the critical steam generator corrosion temperature, the thermal power of the reactor will be lower, resulting in a potentially longer operating cycle time between reactor refueling cycles.

This enables a longer period between refueling which is getting progressively more expensive. The disposal of spent nuclear fuel and waste, which is now a major concern of nuclear industry, will be reduced significantly.

In addition, lower reactor power avails opportunities to perform maintenance on many key apparatuses in the secondary system (the steam cycle in PWRs and the coolant cycle in BWRs) while the reactor is at power. By reducing corrosion and erosion the down time is decreased thus enabling the plant to operate with less down time. It is well known in the art that the fuel replacement cost during downtime is from several hundreds of thousands of dollars to one million dollars for each day, depending upon the plant.

When the reactor is operating at a lower thermal power, there are, in essence, builtin spare components with the arrangement of currently installed equipment.

To underscore the importance of erosion and corrosion in steam equipment it should be noted that maintenance of many secondary-side (i.e., steam handling) components are often the source of unplanned outages.

In the instant invention, the steam turbine has higher efficiency and reduced erosion-corrosion. The reactor steam, prior to entering the high pressure stage of the main turbine, is superheated by a high-pressure-mixer-superheater (HPMS) that utilizes the highly superheated steam from the heat recovery boiler (HRB) of the gas turbine combined cycle. The steam is then conditioned, according to need, by several different components.

In the most commonly used application to improve the efficiency of an operating nuclear power plant the steam would next go to the moisture separator reheater (MSR), that is a common component of existing plants. The MSR can be bypassed depending upon the existing steam quality from the high pressure (HP) stage of the main turbine. The steam is next improved for use by the low pressure (LP) stage of the main turbine. When required this is done in a low pressure mixer superheater (LPMS) which mixes steam from the MSR (when used) with HRB steam. The instant invention has a marked increase in the portion of the LP stage of the main turbine that is driven by superheated steam. This enables a reduction in corrosion and erosion.

The invention also provides an additional avenue to make nuclear stations safer due to the addition of an operating source of alternative emergency power (i.e., the gas turbines). Additionally, the size of the gas turbine and generator is not limited and the instant invention therefore readily lends itself to operation in conjunction with a large gas turbine and generator that could function as an independent source of power during peak times or alone to supply a grid.

BRIEF DESCRIPTION OF THE DRAWINGS

FIG. 1: Is a schematic representation of the steam cycle of a typical nuclear reactor electric generation plant.

FIG. 9a: Is a portion of a Mollier diagram that represents the operation of a typical nuclear reactor electric generation plant.

FIG. 15a: Is a schematic cross sectional representation of the micro-jet mixer.

DESCRIPTION OF THE PREFERRED EMBODIMENTS

The present invention achieves improved performance of a steam powered system by utilizing waste heat from another process, for example exhaust from a gas fired turbine, to make high enthalpy steam. The high enthalpy steam from the waste heat is mixed with the low quality steam source to produce a high enthalpy mixed steam. The low quality steam source includes but is not limited to nuclear, solar, geothermal, or fossil fired. The high enthalpy mixed steam is then sent through a turbine and work extracted either directly as shaft work to a load, for example a marine propeller, or indirectly to a load by generating electricity with a generator.

Low quality steam is not superheated but is either saturated steam or wet steam containing water droplets at moderate pressure. A moderate pressure is from about 5 bar to about 1 preferably from about 10 bar to about 70 bar. A moderate pressure is from about 5 bar to about 130 bar, preferably from about 10 bar to about 70 bar. High enthalpy steam is superheated, preferably superheated to at least 500 C and preferably at a pressure of at least 130 bar which are typical of conditions used at commercial fossil fired steam systems.

Figure 4A:
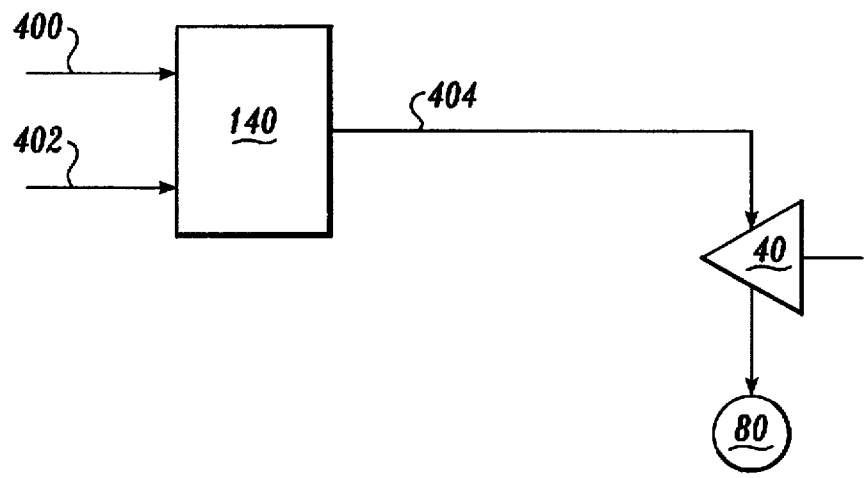
FIG. 4a: Is a schematic representation of a typical steam driven power system with a low pressure turbine utilizing the invention to improve performance.

A simple embodiment is shown in FIG. 4a. The high enthalpy steam 400 and the low quality steam 402 are mixed in the microjet mixer 140. The high enthalpy mixed steam 404 is directed to a turbine 40, preferably a low pressure turbine, that exhausts to a condenser 80.

Figure 4B:
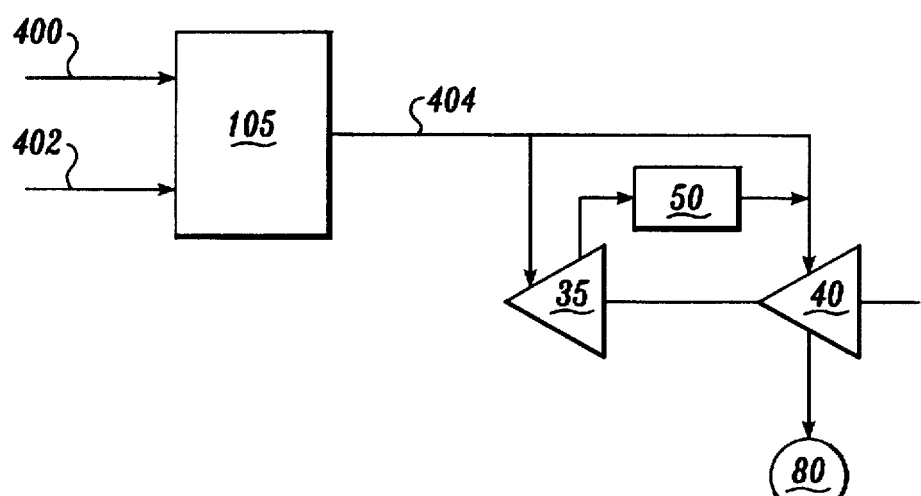
FIG. 4b: Is a schematic representation of a typical steam driven power system with high and low pressure turbines utilizing the invention to improve performance.

A further embodiment is shown in FIG. 4b. The high enthalpy steam 400 and the low quality steam 402 are mixed in the micro-jet mixer 105. The high enthalpy mixed steam 404, is directed to a high pressure turbine 35. The high pressure turbine 35 exhausts to an MSR 50 the output of which may be combined with the high enthalpy mixed steam 404 and passed through a low pressure turbine 40 which exhausts to a condenser 80.

ENHANCEMENT OF OPERATIONAL PERFORMANCE

Figure 4:
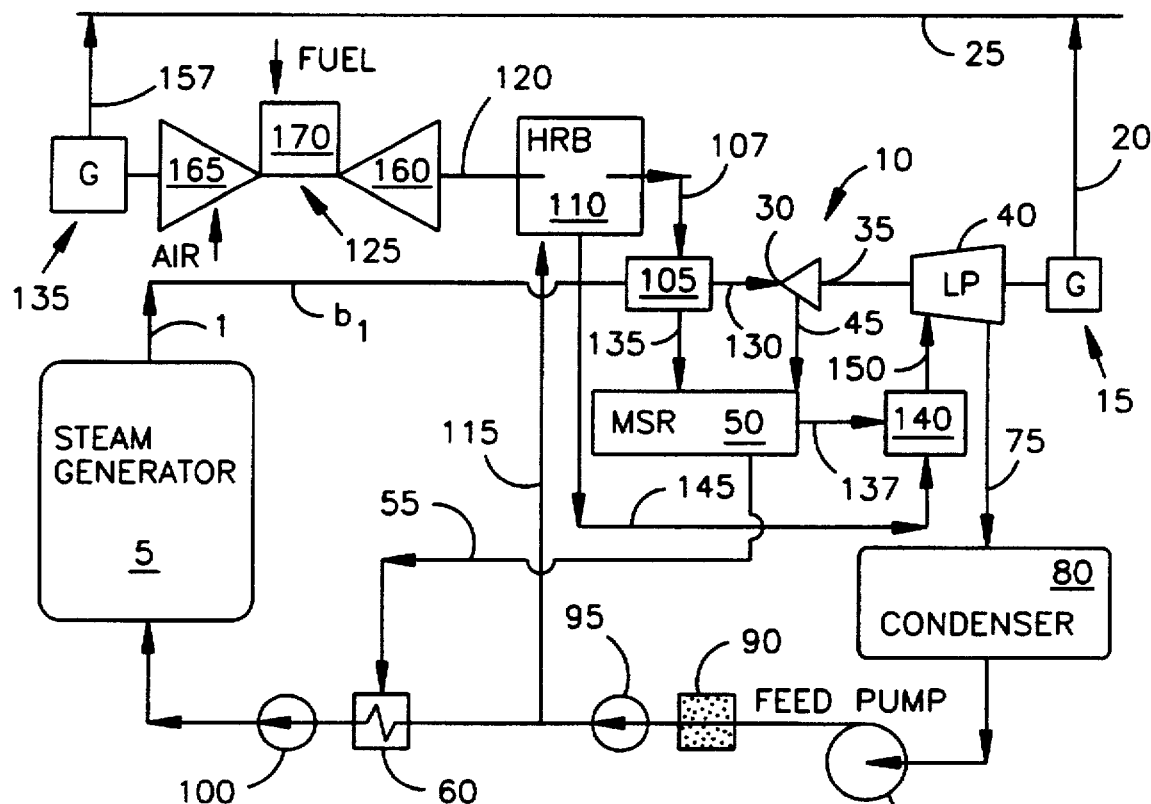
FIG. 4: Is a schematic representation of a typical nuclear reactor electric generation plant utilizing the invention to improve performance.

FIG. 4 illustrates the overall plant schematic for a nuclear plant with the instant invention installed in the downstream portion of main steam 1 piping 1513 of the steam generator 5. It will become apparent how the instant invention improves the operational characteristics of HP inlet mixed steam 130 entering the entrance 30 to the HP Stage 35 and the LP stage 40 of the main turbine 10. It should be noted in both FIGS. 1 and 4, main steam 1 denotes the main steam piping 1513 and the flow of main steam 1 within that piping.

Main steam 1 from the steam generator 5 arrives at a high-pressure-mixer superheater (HPMS) 105 where it is superheated to the temperature from 570° to 680° F. (299°–360° C.) by the high enthalpy-high pressure steam HRB outlet steam 107 from a heat recovery boiler (HRB) 110.

USE OF HRB IN THE INSTANT INVENTION

Use of a conventional HRB 110 as described above is contemplated by the instant invention. However, the steam generated in the HRB will be used in a different manner.

The HRB high pressure steam 107 exits with high pressure (typically from 1000 to 1315 psig (93 bar)) and high temperature (typically from 830° to 935° F. (444°–500° C.)), and is sent to the high pressure mixer separator (HPMS) 105 to mix and to superheat main steam 1.

The HRB low pressure steam 145 exits with a pressure (typically from 80 to 200 psig (14 bar)) and high temperature (typically from 830° to 935° F. (450°–500° C.)), and is sent to the low pressure mixer superheater (LPMS) 140 to mix and superheat MSR discharge steam 137.

Figure 18A:
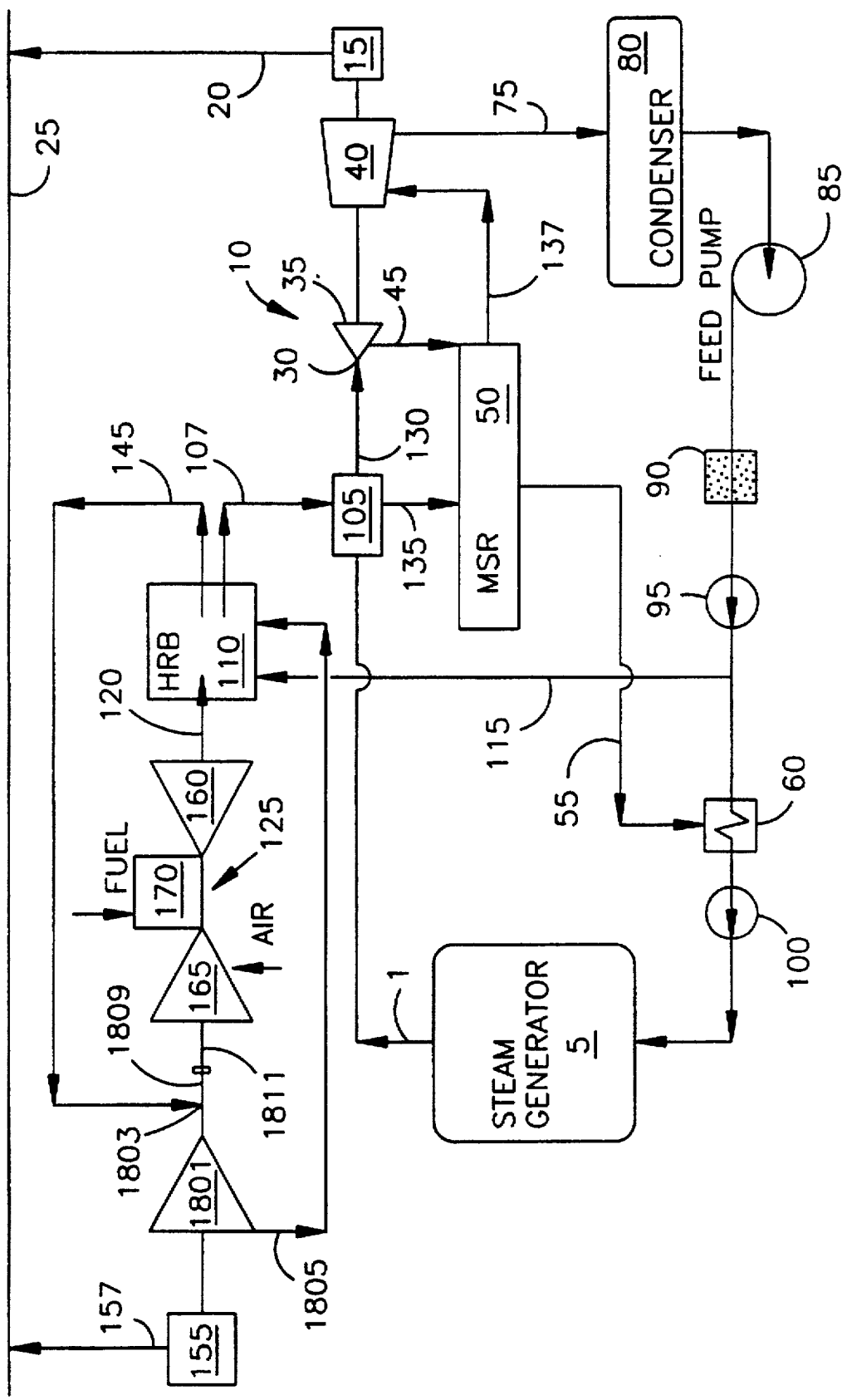
FIG. 18a: Is a schematic representation of an embodiment of the instant invention installed in a typical nuclear reactor electric generation plant that employs a booster turbine and does not use a LPMS.
Figure 18B:
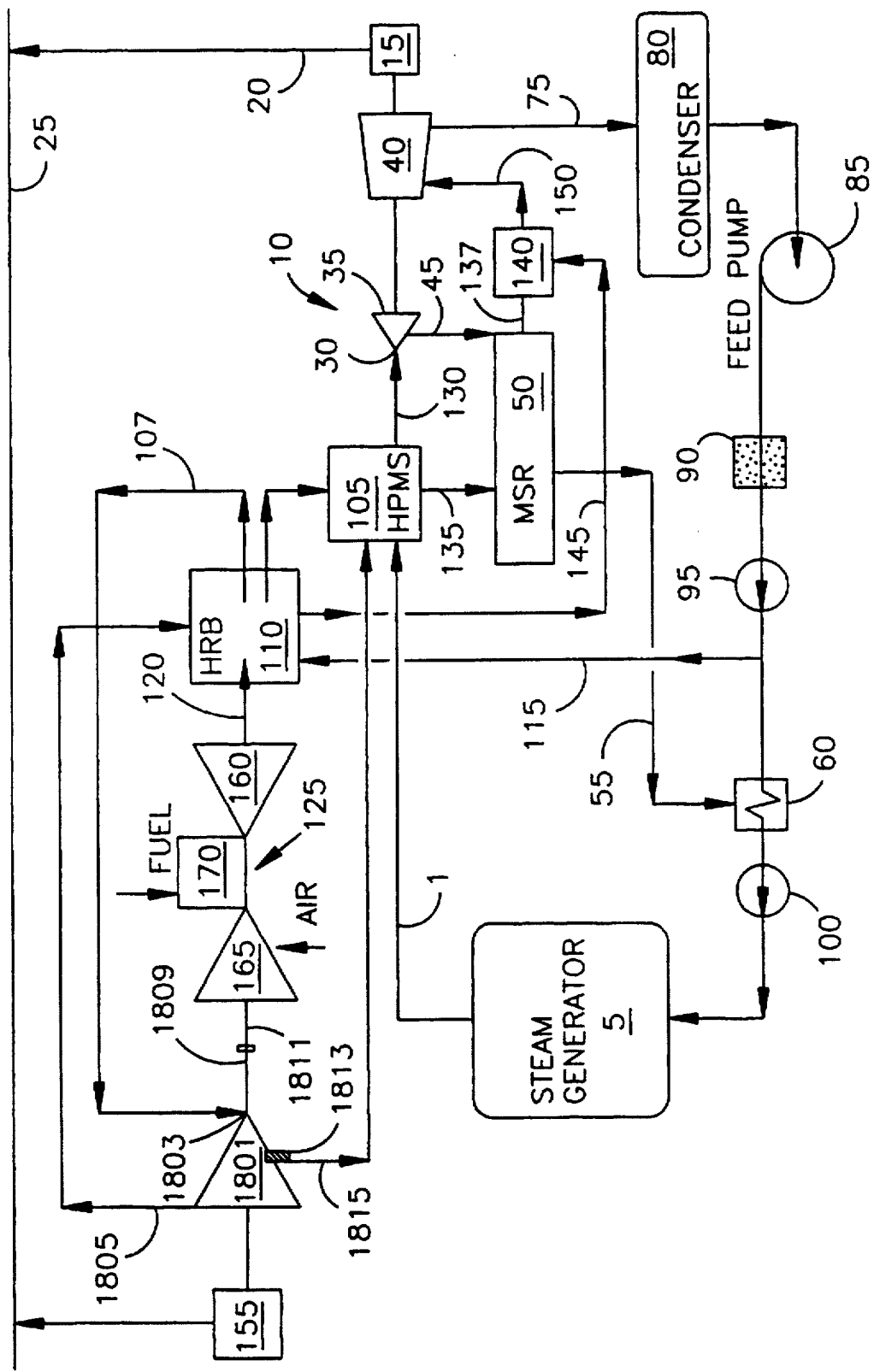
FIG. 18b: Is a schematic representation of an embodiment of the instant invention installed in a typical nuclear reactor electric generation plant that employs a booster turbine and a LPMS.

Referring to FIGS. 18a and 18b, when it is desirable not to use a LPMS 140 the HRB high pressure steam 107 pressure should be boosted to approximately 2000 psig (140 bar), and the temperature should be from 830° to 1050° F. (444°–565° C.).

USE OF MSR IN CONJUNCTION WITH INSTANT INVENTION

Figure 2:
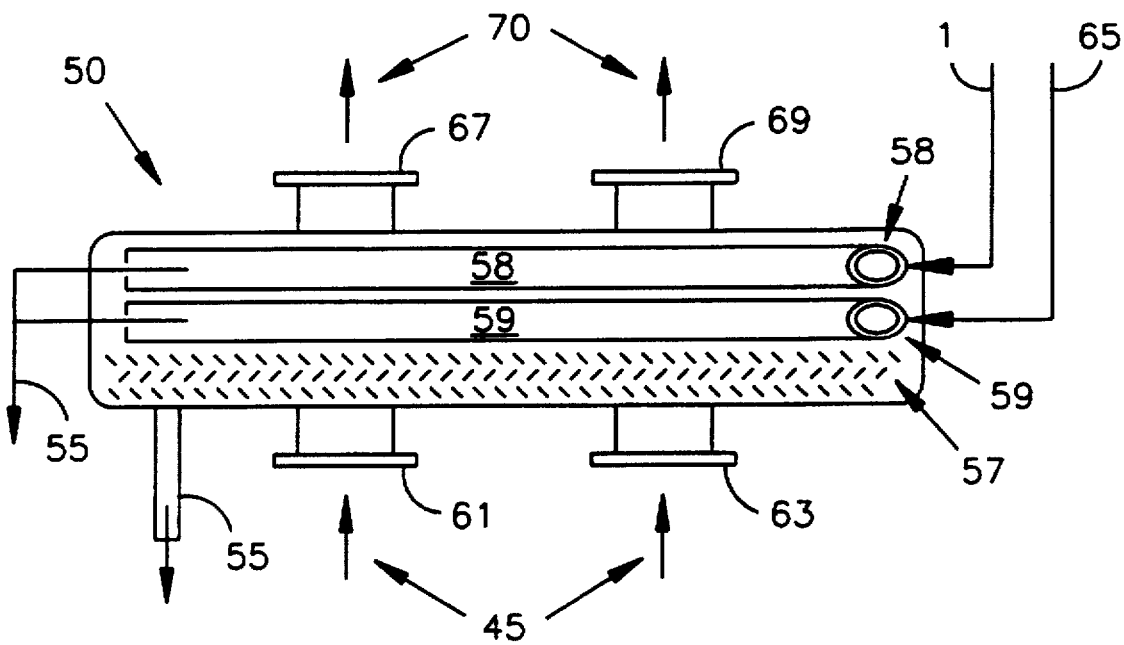
FIG. 2: Is a sectional view of a diagrammatic representation of the flow path in a MSR used in a typical nuclear electric generation plant.
Figure 6:
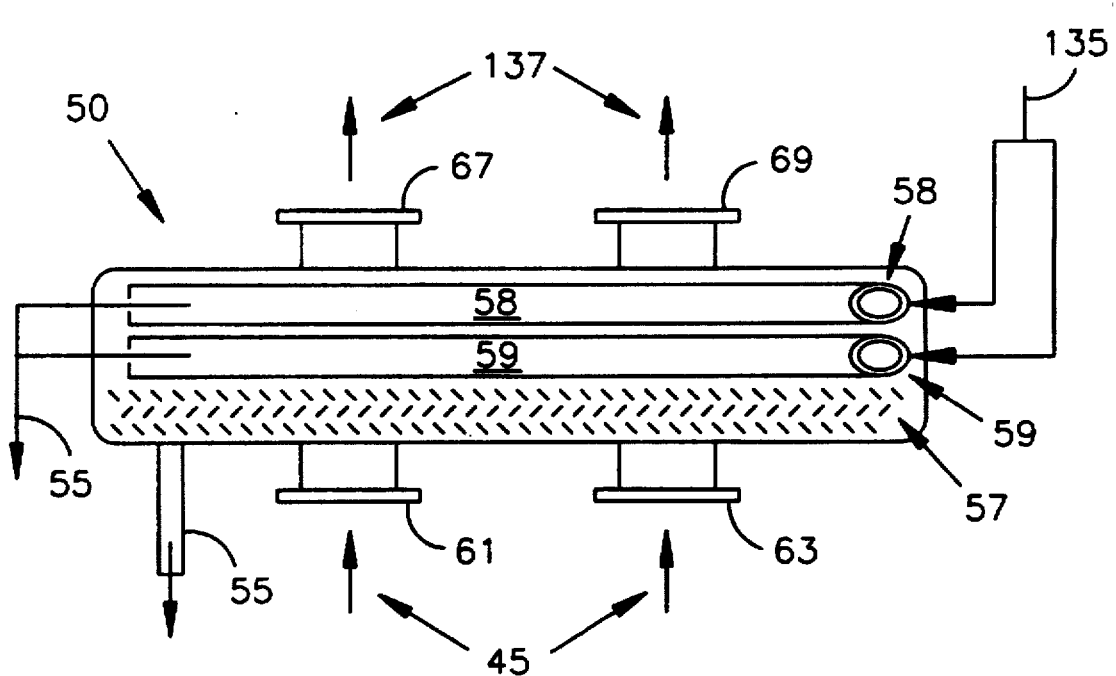
FIG. 6: Is sectional view of a schematic representation of the flow path in a MSR used in a nuclear electric generation plant utilizing the instant invention.
Figure 3:
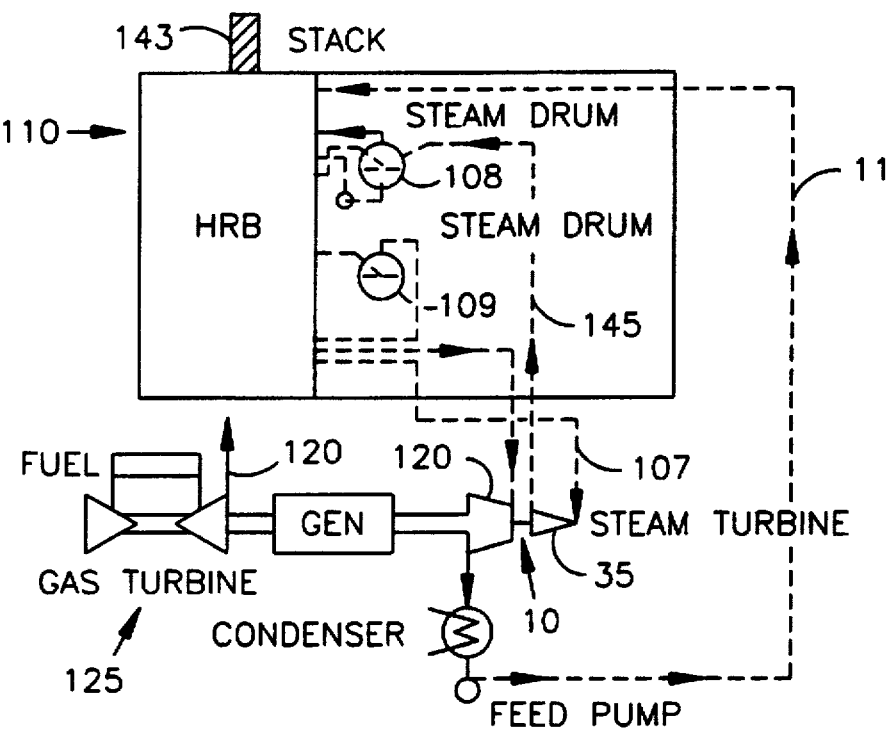
FIG. 3: Is a schematic representation of an HRB when used in a combined cycle power plant.

Now referring to FIG. 6, the MSR 50 that is already installed in the plant can be used. The construction of the MSR 50 is not critical to the instant invention and is well known in the art. Moisture 55 that is removed from the HP exhaust steam 45 is returned to the feed system through a reheater 60.

Once the moisture 55 is separated from the HP exhaust steam 45 it is reheated by using HPMS outlet steam 135 from the HPMS 105, becoming MSR discharge steam 137. The MSR discharge steam 137 is then sent to the LPMS 140 where it is superheated by the high enthalpy HRB low pressure steam 145 from the HRB 110 yielding high enthalpy low pressure steam, referred to as LPMS. This discharge steam 150 is then sent directly to the LP stage 40 of the main turbine 10. This treatment of HP exhaust steam 45 before entering the low pressure stage 40 of the steam turbine 10 results in high quality steam in flow passes, reducing erosion of rotor blades and diaphragms and increasing in efficiency by 3 to 5 percent.

GAS TURBINE AS A GENERATOR

Now referring again to FIG. 4, the gas turbine 125 is well known in the art as a reliable source of electrical energy. This enables the same turbine 125 that is used to supply heated exhaust 120 to act as the source of electrical power 157 for use in emergency situations. This emergency electrical power 157 would be in addition to, or to supplement, the diesel generators that are typically installed in nuclear power stations.

Figure 5:
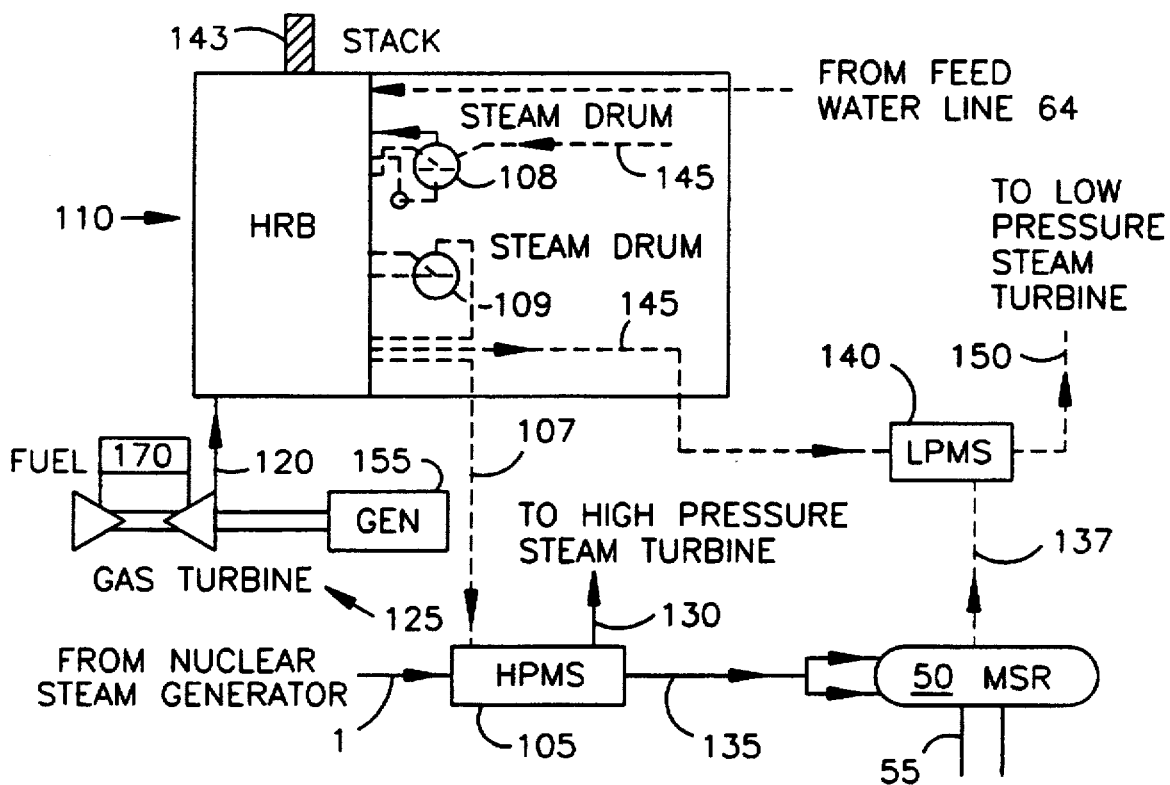
FIG. 5: Is schematic representation of the flow path in a HRB used in a nuclear electric generation plant utilizing the instant invention.

The gas turbine generator heat is the heat available in the gas turbine exhaust 120. The amount of heat is only critical to the invention as long as it provides sufficient energy to make sure the heat recovery boiler high pressure steam 107 has sufficient enthalpy to increase the operation characteristics of the steam at the turbine inlet 30 and to supply the needed energy to the LPMS 140. Any energy available above this amount can be sent up the stack 143 as shown in FIG. 5. Therefore, the gas turbine generator can be used as an independent source of electrical power 157 to the grid 25. This enables the dual use of a gas turbine electrical generator set 155. One use is to supply energy for the instant invention, and another use is as an independent electrical energy source to supply electricity to the grid 25.

GRAPHICAL REPRESENTATION OF TYPICAL PLANT PERFORMANCE

The Mollier chart for the typical steam cycle of a typical light water reactor electric power generation system is illustrated in FIG. 9a. The diagram in FIG. 9a corresponds to equipment that is illustrated in FIG. 1.

Expansion in the HP stage of the Main Turbine ($a_1$–$a_2$)

Main steam 1 expands in the HP stage 35 of the main turbine 10 until it exits as HP exhaust steam 45. This line on FIG. 9a represents a decrease in quality from about 1 to about 0.85, and is illustrated as going from point $a_1$ to point $a_2$.

Removal of Moisture from HP exiting wet steam in the MSR ($a_2$–$a_4$)

In the MSR 50 the moisture 55 from HP exhaust steam 45 is first removed by chevron separating elements 57 that increase the quality to about 0.98 that is graphically represented in FIG. 9a by the line from point $a_2$ to $a_3$.

Removal of Moisture from HP exiting wet steam in the MSR ($a_4$–$a_6$)

After the moisture 55 is separated, the exhaust steam 45 is heated in two stages. The first is by extraction steam 65 and then by main steam 1. This removes all remaining moisture or superheats the HP exhaust steam 45 to point $a_5$ or $a_6$ depending upon the operational characteristics in that plant at that time. At this point the HP exhaust steam 45 is typically at a temperature of about 570° F. (299° C.), and the MSR 50 exhaust steam 70 is typically at a temperature of about 500° F. (260° C.).

Extraction of Work by LP stage of the Main Turbine ($a_6$–$a_7$)

Upon exiting the MSR 50, the MSR exhaust steam 70 feeds into the LP stage 40 of the main turbine 10 graphically shown as $a_6$ on FIG. 9a. Work is extracted in the LP stage 40 that is graphically shown as going from $a_6$ to $a_7$, which is then directed to the condenser 80. The line representing the condenser 80 is also indicated on FIG. 9a.

GRAPHICAL REPRESENTATION OF PLANT PERFORMANCE IMPROVED BY THE INSTANT INVENTION

Figure 9B:
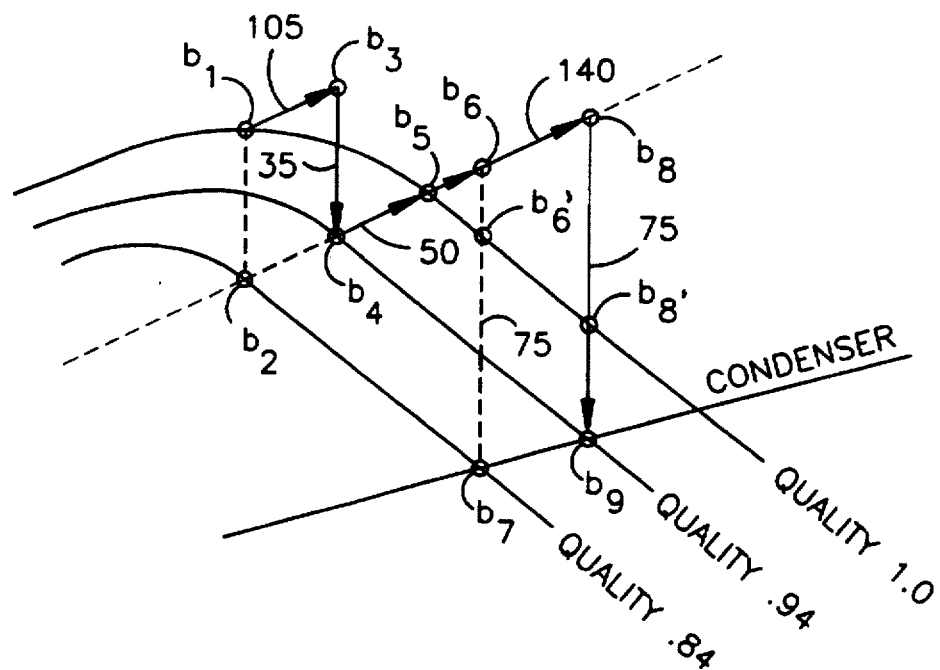
FIG. 9b: Is a portion of a Mollier diagram that represents the operation of a typical nuclear reactor electric generation plant utilizing the invention to improve performance.

The Mollier chart for the typical steam cycle of a light water reactor electrical generation station with instant invention installed is illustrated in FIG. 9b. The diagram in FIG. 9b corresponds to equipment that is illustrated in FIG. 4.

Enhancement of Main Steam ($b_1$–$b_3$)

Referring now to FIG. 9b, main steam 1 enters the inlet to the HPMS 105 at point $b_1$ as wet main steam 1 where it is superheated to point $b_3$, and exits as superheated HP inlet mixed steam 130.

Expansion in the HP stage of the Main Turbine ($b_3$–$b_4$)

The HP inlet mixed steam 130 then enters the HP stage 35 of the main turbine 10 where it expands and work is extracted until it exits as HP exhaust steam 45. As illustrated on FIG. 9b, this represents a decrease in quality from superheated condition to about 0.94. On FIG. 9b this is illustrated as going from point $b_3$ to point $b_4$, and corresponds to going from $a_1$ to $a_2$ in a conventional plant as illustrated in FIG. 9a.

Removal of Moisture from HP exiting wet steam in the MSR ($b_4$–$b_5$)

In the MSR 50 the moisture 55 from HP exhaust steam 45 is removed by chevron separating elements 57 that increase the quality to about 1.0 that is graphically represented in FIG. 9 by the line from point $b_4$ to $b_5$.

Removal of Moisture from HP exiting wet steam in the MSR ($b_5$–$b_6$)

After the moisture 55 is separated from the HP exhaust steam 45, it is heated in two stages by high pressure mixer separator (HPMS) outlet steam 135. This removes all remaining moisture and superheats the HP exhaust steam 45 to point $b_6$. The HP exhaust steam 45 is typically at a quality of 0.94 at this point. At point $b_5$ the temperature is about 390° F. (200° C.). If the embodiment without an LPMS 140 is used, the HP exhaust steam 45 is typically at a temperature of about 550° to 600° F. (288°–316° C.) at this point. At point $b_6$ a temperature is about 550°–600° F. (288°–316° C.).

Mixing and Reheating of MSR exiting wet steam in the LPMS ($b_6$–$b_8$)

After exiting the MSR 50 the MSR discharge steam 137 is mixed and reheated in the low pressure mixer superheater (LPMS) 140 by HRB low pressure steam 145 where it is fed into the LP stage 40 of the main turbine 10.

Extraction of Work by LP stage of the Main Turbine ($b_8$–$b_9$)

Work is being extracted in the LP stage 40 and is represented by line $b_8$ to $b_9$ on FIG. 9b. The line representing the condenser 80 is indicated on FIGS. 9a and 9b.

Elimination of the MSR

An additional advantage of the invention is elimination of the MSR 50. When the conditioning of the steam in going from $b_6$ to $b_8$ is greater than the conditioning that occurs in going from $b_4$ to $b_6$, the MSR 50 is no longer necessary.

LP Stage Utilizes Superheated Steam ($b_8$ to $b_8$.)

Still another advantage of the invention is that the LPMS discharge steam 150 that is utilized by the LP stage 40 of the main turbine 10 is superheated for a longer portion of travel through the LP stage 40, than that of the MSR exhaust steam 70. This reduces the erosion of the LP stage 40 blades (not shown). Referring to FIG. 9a and FIG. 9b the distance from $b_8$ to $b_8$. is much larger than the distance from $a_6$ to $a_6$., each distance being a diagrammatic representation of the path in which work is extracted from the superheated steam within the LP stage 40 of the main turbine 10.

REDUCTION OF CORROSION TO STEAM GENERATOR

Figure 7:
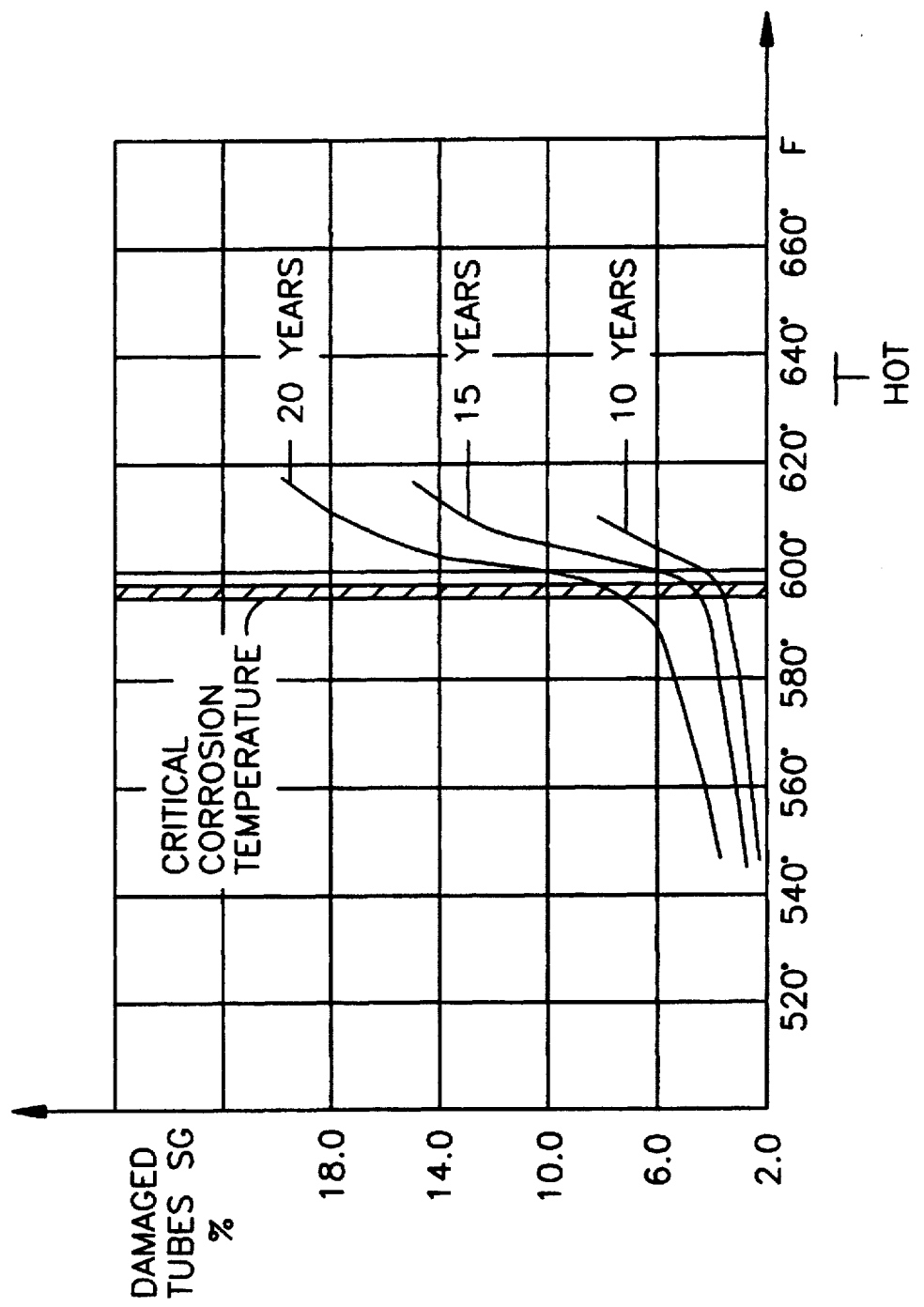
FIG. 7: Is a graph of the percentage of tubes plugged due to corrosion versus time in operation with various temperature curves being illustrated.

The corrosion of secondary components in any nuclear power plant is temperature dependent. This dependence is illustrated in FIG. 7. The most detrimental aspect of corrosion in a nuclear power plant steam generator 5 is tube failure due to corrosion. As illustrated in FIG. 7, with temperatures below 600° F. (315° C.), plugging versus years of operation only slightly increases. However, above 600° F. (315° C.) plugging increases dramatically.

Pressurized Water Reactors

Figure 8A:
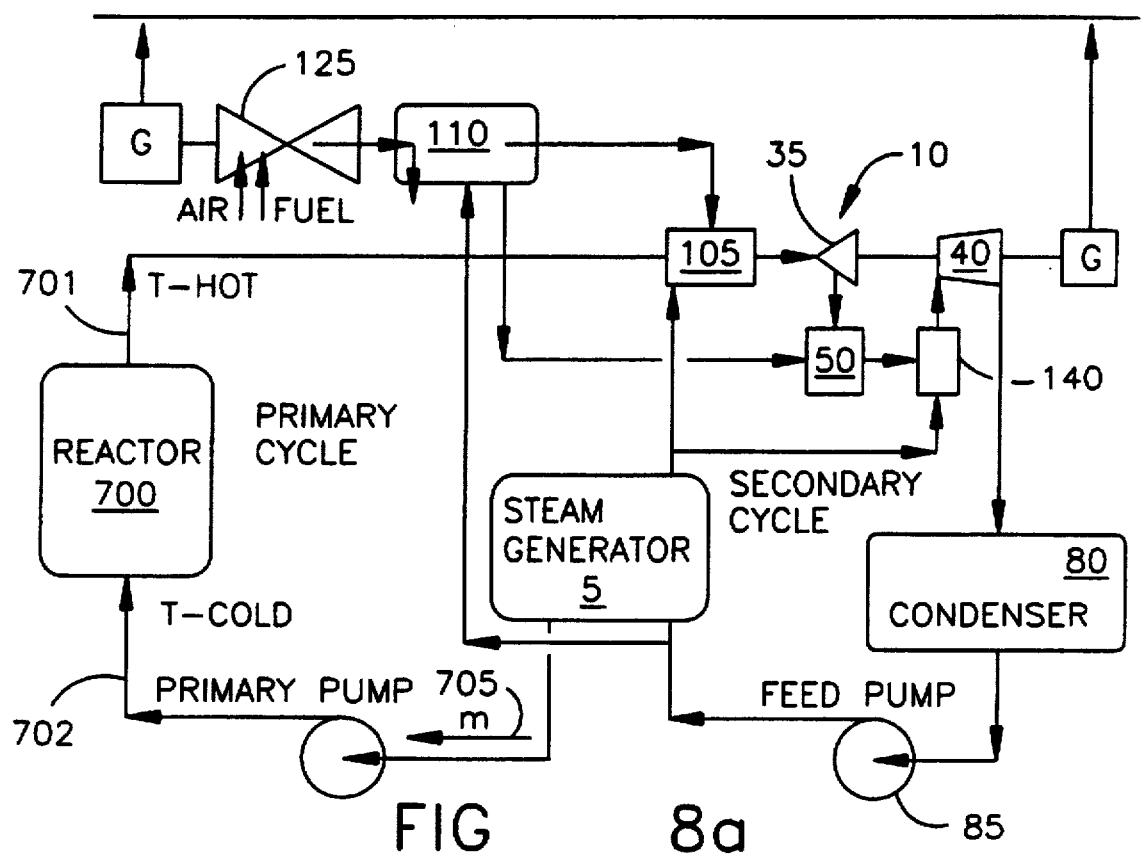
FIG. 8a: Is a schematic representation of the primary and second cycles of a pressurized water reactor electrical generation plant utilizing the instant invention.

Referring now to FIG. 8a, the instant invention enables a reduction in $T_{hot}$ 701, which is due to the lowering of the temperature differential, $T_{hot}$–$T_{cold}$ (701–702). For a given thermal output of the reactor 700, assuming that (1) the mass flow rate 705 in the primary cycle is held constant, and (2) that $T_{cold}$ 702 constant is held constant, as illustrated by the following equation:

$$Power_{reactor} = C_p * mass_{flow\ rate} * (T_{hot} - T_{cold}),$$

where $C_p$ is the specific heat of the primary system coolant.

Boiling Water Reactors

Figure 8B:
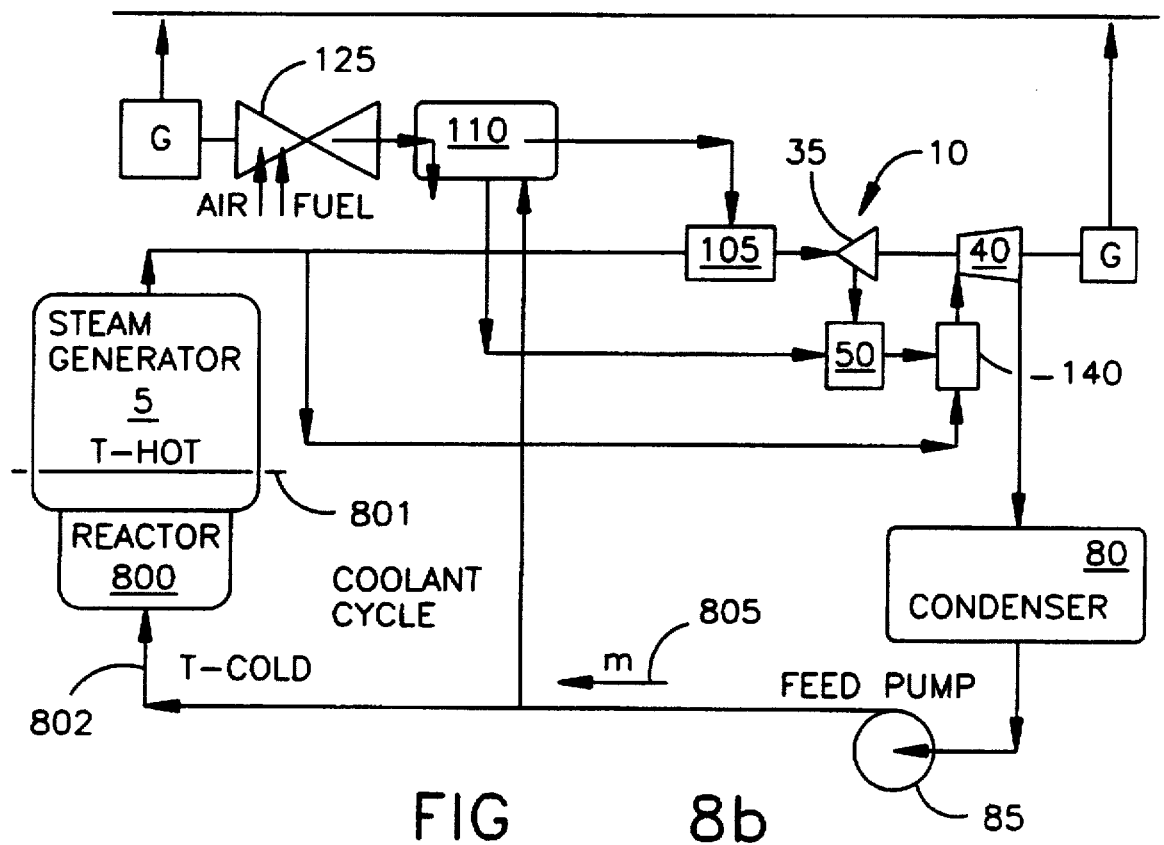
FIG. 8b: Is a schematic representation of the primary and second cycles of a boiling water reactor electrical generation plant utilizing the instant invention.

Referring now to FIG. 8b, the instant invention enables a reduction in $T_{hot}$ 801, which is due to the lowering of the temperature differential, $T_{hot}$–$T_{cold}$, (801–802) for a given thermal output of the reactor, assuming that (1) the mass flow rate in the primary system is held constant, and (2) that $T_{cold}$ is held constant, as illustrated by the previous equation, except where $C_p$ is the specific heat of the system coolant. The reactor 800 is a boiling water reactor, and $T_{hot}$ is considered to be the average temperature at the outlet of the reactor 800 and the inlet to the steam generator 5 which in a boiling water reactor is one unit. The thermal efficiency is higher; consequently for a lower value of $T_{hot}$ the same power level of the rated unit may be maintained. The reactor thermal power level can be reduced, the fuel cycle length can be extended, as well as a reduction in reactor vessel embrittlement.

FUEL CYCLE AND ENRICHMENT EFFECTS

Still another advantage of the instant invention is to decrease the enrichment requirements of the reduced thermal power of nuclear reactors. The conversion from thermal energy to electrical energy is typically from 33–35% for plants without the instant invention and about 42–45% for plants with the invention.

Since the nuclear reactor thermal energy output is directly keyed to how much nuclear fuel is present in the reactor and at what fission rate it is operated at, less fissions will be required. Any given fuel assembly has so many fissions possible over the life of the plant therefore the life of the plant is extended.

The reduction in the requirement of thermal power allows for the reduction of fuel enrichment.

Efficiency Without the Instant Invention

Net efficiency for a nuclear plant without the invention can be expressed by the following equation:

$$\text{Efficiency} = v_{net} = \frac{\text{Plant Electrical Output}}{\text{Plant Thermal Output}} = \frac{MW_{E\text{-}gen}}{MW_{Rx}}$$

where $MW_{E\text{-}gen}$ is the total electrical output of the plant, and $MW_{Rx}$ is the total heat output of the reactor.

Efficiency With the Instant Invention

In a nuclear plant utilizing the instant invention, the net efficiency can be expressed by the following equation:

$$v_{net} = \frac{\text{Plant Electrical Output}}{\text{Total Thermal Output}} = \frac{MW_{E\text{-}gen} + MW_{E\text{-}tur}}{MW_{Rx} + MW_{tur\text{-}fuel}}$$

where $MW_{E\text{-}tur}$ is the output that the electrical generator of gas turbine generator 155 unit supplies to the grid 25, and $MW_{tur\text{-}fuel}$ is the energy release by the fuel in the burner 170 of the gas turbine 125. The increase in $v_{net}$ is due to both the powers added by the gas turbine generator and the lowering of the $MW_{Rx}$ for a given $MW_{E\text{-}gen}$.

Since the nuclear reactor thermal output is directly keyed to how much nuclear fuel is present in the reactor and at what fission rate it is operated at, less fissions will be required. Any given fuel assembly has so many fissions possible over the life of the plant; therefore, the life of the plant is extended while maintaining the same amount of electrical power 157 supplied to the grid 25.

Simulated computer runs on cost and efficiency have indicated that a 41.5% efficiency is possible when the instant invention is used on a 1260 $MW_e$ PWR plant with 3570 $MW_{th}$, which normally has an efficiency of 34%. In this computer simulation, $T_{hot}$ went from 615° F. (323° C.) to a $T_{hot}$ of 597° F. (314° C.).

OPERATIONAL REQUIREMENTS

There are many types of nuclear electrical generation plants now in operation. Each plant will have its individual operational requirements that can influence how the instant invention is applied to that particular system. The main factors that would influence the selection of the most applicable embodiment include but are not limited to: (1) steam pressure requirements; (2) steam temperature requirements; (3) steam quality requirements; (4) type of heat recover boiler (HRB) being used (i.e., does it have a plurality of steam discharge pressures); (5) maintenance condition of the equipment, for example does the moisture separator reheater (MSR) need replacing; and (6) cost and availability of the equipment needed to install that particular embodiment.

Figure 13:
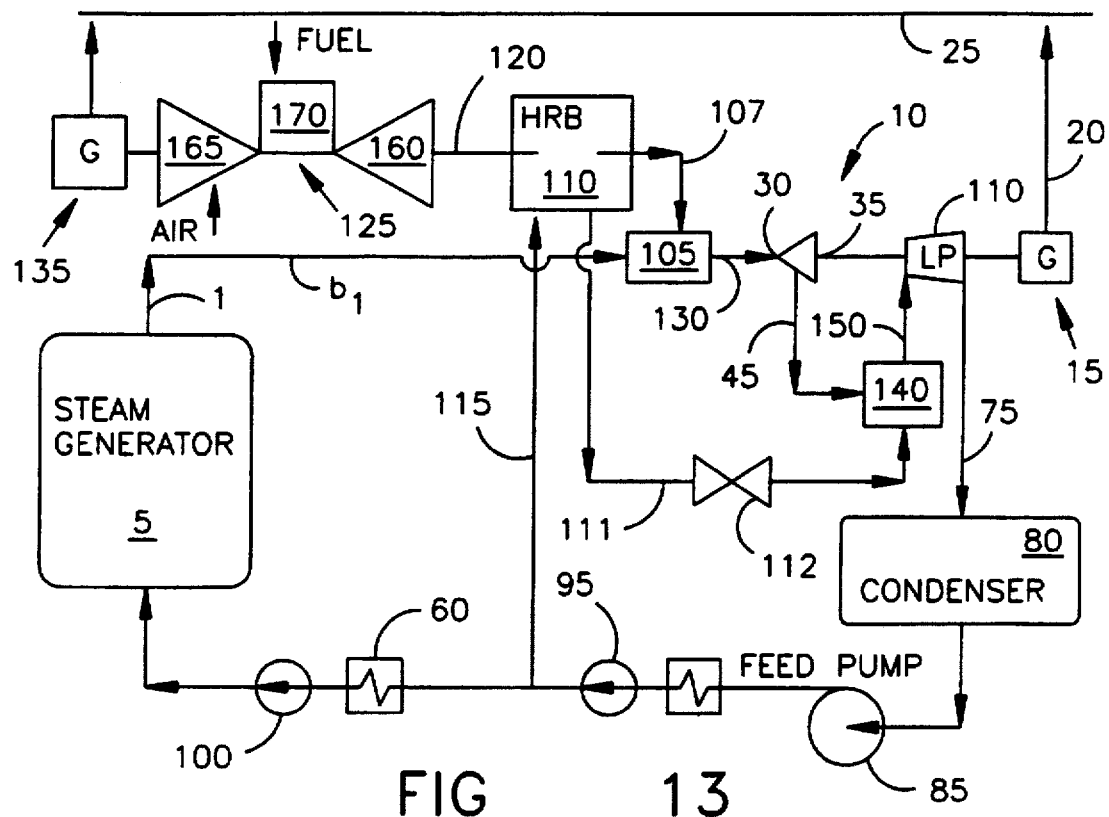
FIG. 13: Is a schematic representation of a typical nuclear reactor electric generation plant that has a heat recovery boiler that has only pressure steam output.

Referring now to FIG. 13, an embodiment is illustrated that utilizes a heat recovery boiler that has only one steam pressure 107. This embodiment would use a second high pressure line 111 of the heat recovery boiler high pressure steam line 107. The second high pressure steam line 111 will require a pressure reduction device 112. In this embodiment the high pressure stage exhaust steam 45 is mixed with a second heat recovery boiler high pressure steam to form the low pressure mixer superheater (LPMS) discharge steam 150.

Figure 14:
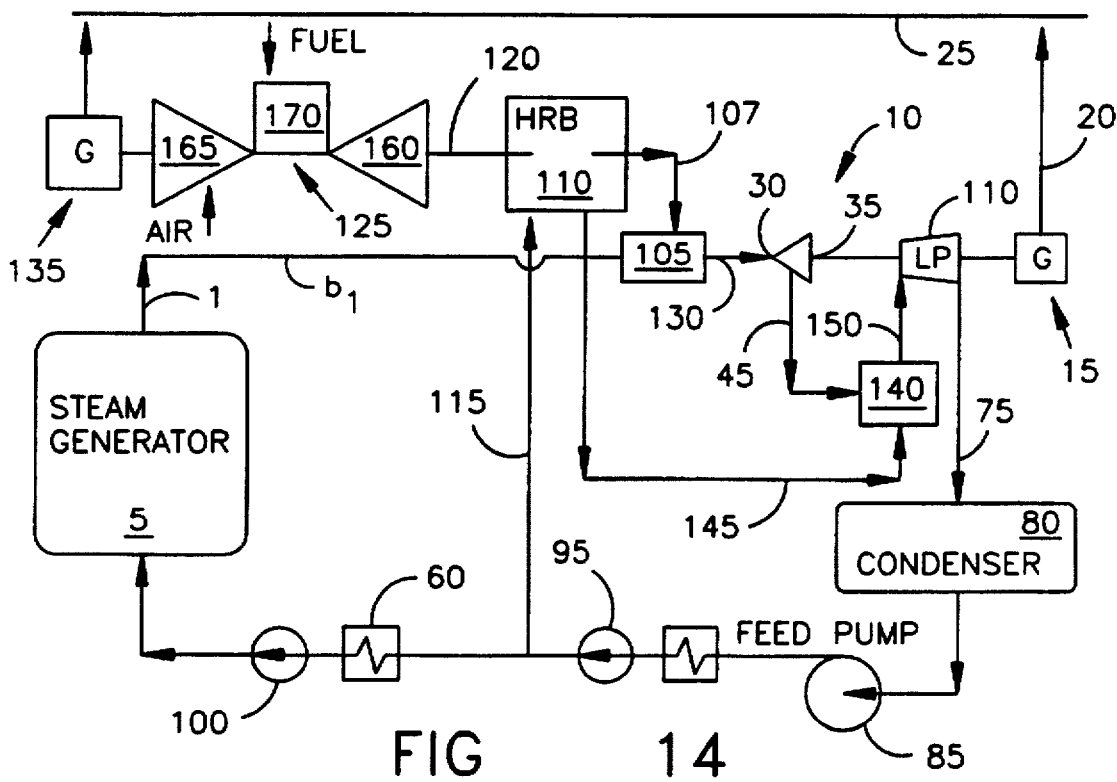
FIG. 14: Is a schematic representation of a typical nuclear reactor electric generation plant that has a heat recovery boiler that has only two steam pressure outputs and no moisture separator reheater.

Referring now to FIG. 14, an embodiment is illustrated that utilizes a heat recovery boiler that has two steam pressures; i.e., the HRB high pressure steam 107 and the HRB low pressure steam 145. This embodiment would mix the HP exhaust steam 45 directly with HRB low pressure steam 145 to form the low pressure mixer superheater discharge steam.

SELECTION OF STEAM MIXING EQUIPMENT

Some of the individual components utilized in the instant invention contains the same type of equipment and materials found in many existing combined cycle plants, as well as some found in existing nuclear power plants. The physical construction of these components is not material to the instant invention.

There are many options for the selection of the mixer superheaters that are utilized in the instant invention in addition to the MSR's 50 discussed above. Specifically, the high pressure mixer superheater 105 and the low pressure mixer superheater 140.

Figure 10:
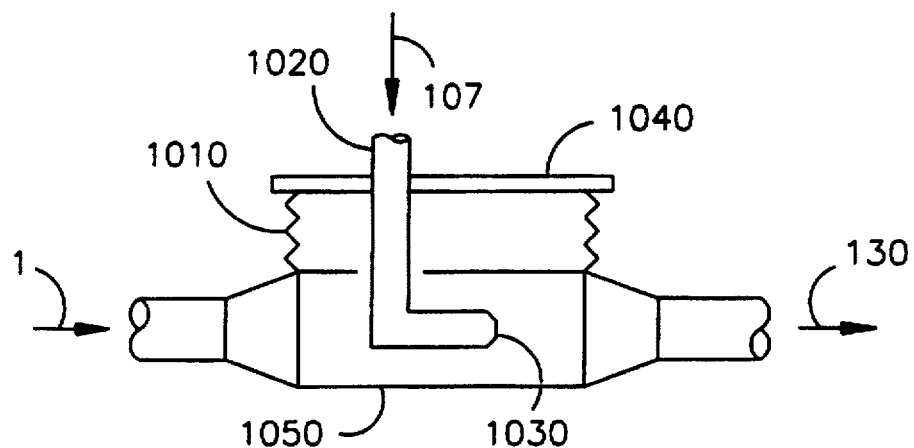
FIG. 10: Is a schematic sectional view of a tube steam mixer superheater jet chamber with a bellows arrangement.

FIG. 10 illustrates a bellows 1010 connection for a tube 1020 injection of 107 through a nozzle 1030 into main steam 1 to form HP inlet mixed steam 130. The bellows arrangement 1010, or some other mechanism to allow for expansion and contraction, is necessary for all steam systems. Bellows arrangements 1010 typically have an upper hatch 1040 to allow for servicing. Typically an expanded portion of piping 1050 is installed to facilitate the insertion of the tube 1020

Figure 11:
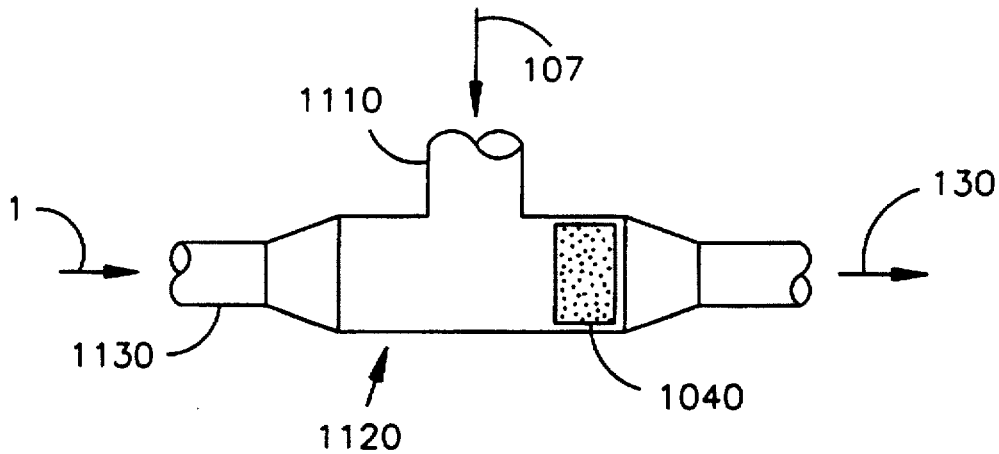
FIG. 11: Is a schematic sectional view of a piping tee with a honeycomb mixer section inserted.

FIG. 11 illustrates a honeycomb mixer placed in an expanded portion of pipe down stream of where 107 enters the main steam 1 flow. This type of mixer-superheater typically resembles a piping tee, with pipe 1110 being the vertical leg and the expanded section 1120, between the inlet 1130 and the outlet 1140 forming the horizontal leg.

Figure 12:
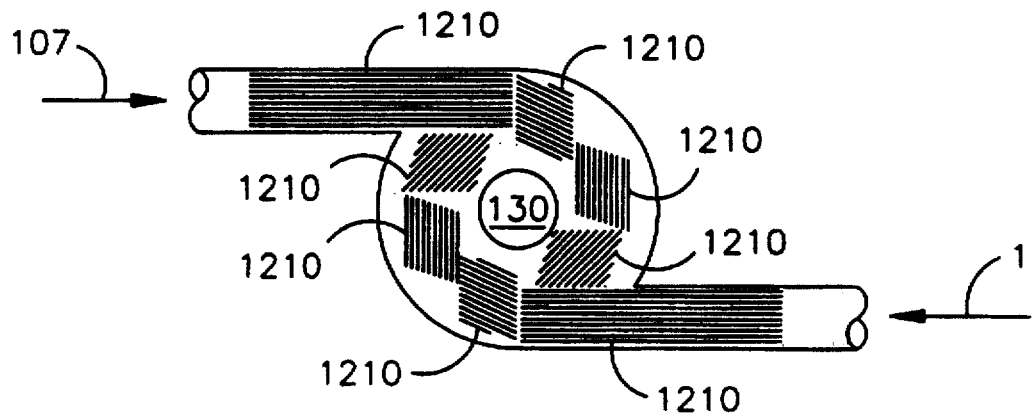
FIG. 12: Is a schematic sectional view of a vane-vortex steam mixer superheater arrangement.

FIG. 12 illustrates a vortex-vane mixer in which 107 a main steam 1 is fed into a series of vanes 1210 that induces a clockwise pattern, with the pipe and vane arrangement of FIG. 12, that causes 107 and 1 to mix. The resulting mixture, HP inlet mixed steam 130, is typically removed by pipe in the plane perpendicular to the plane of HRB high pressure steam 107 and main steam 1.

These same type of mixers can be utilized in the mixer assembly 1507 that is used in the micro-jet mixer 105 that is discussed below.

MICRO-JET MIXER

Figure 15B:
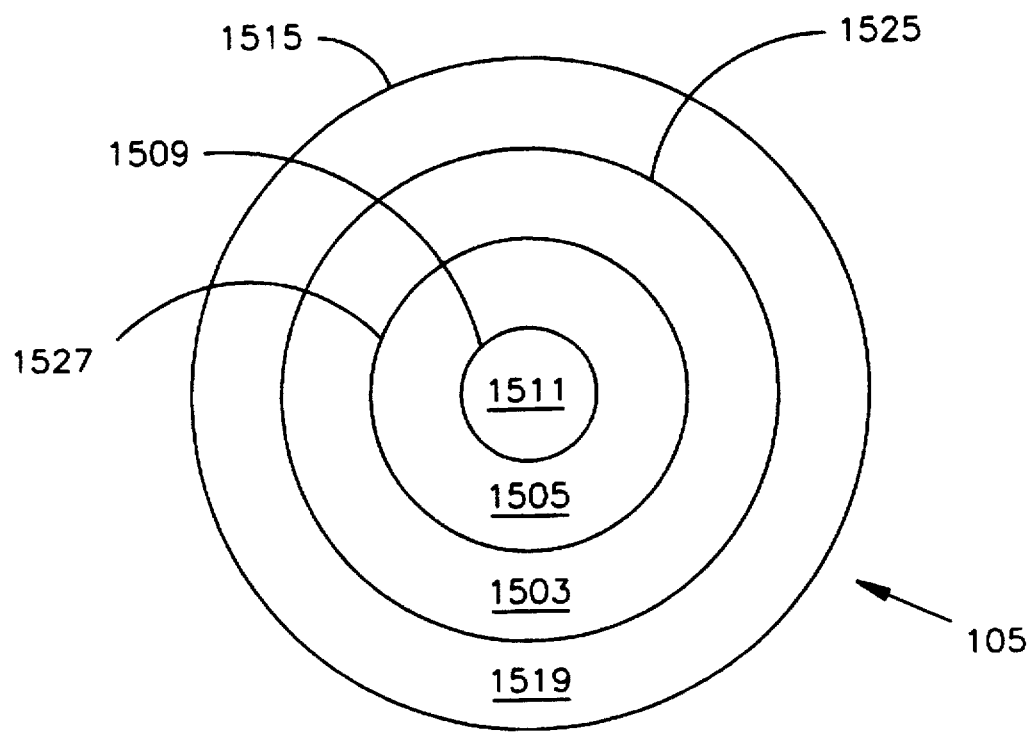
FIG. 15b: Is a longitudinal view of the micro-jet mixer through lines 16—16.

Now referring to FIGS. 15a and 15b, the HPMS 105 is a micro-jet mixer 105 that is particularly suited to achieving thorough mixing with a minimal pressure drop. In the first stage of the mixing process the micro-jet mixer 105 mixes main steam 1 with HRB outlet steam 107 to form a combined steam flow 1501. The micro-jet mixer 105 is a cylindrical tube and shell arrangement in which steam flows 1,107 are directed together in a mixing area 1503 wherein a combined steam flow 1501 is formed.

In the second stage the combined steam flow 1501 flows through baffle slots 1529 into a timing chamber 1505 which allows further mixing, thereby forming mixed steam flow 1533.

The final stage of mixing is done by directing the mixed steam flow 1533 through a mixer assembly 1507 mounted on or in an exit guide 1509, and then finally exiting the exit chamber 1511, where it becomes HP inlet mixed steam 130, which is finally directed via main steam piping 1513 to the steam turbine 10.

The micro-jet mixer 105 and its major components ares preferable cylindrical in shape. However, other shapes are within the contemplation of the practice of the invention. Particularly those that are substantially circular or have a regular geometric shape.

Micro-Jet Mixer Detailed Flow Path

Main steam 1 enters the mixer shell 1515 at the inlet chamber 1516 via the main steam inlet 1517 and then flows around the slotted baffle 1527 into the mixing area 1503. The HRB outlet steam 107 enters first through the outer annulus 1519 via a HRB steam inlet 1521 and then through micro-jets 1523 into the mixing area 1503. The typical arrangement of HRB steam inlets 1521 is to have a plurality of inlets distributed axially around the circumference of the mixer shell 1515. FIG. 15a illustrates two HRB steam inlets 1521 diametrically disposed one to the other.

The combined flow 1501 proceeds in the space between the perforated baffle 1525 and the slotted baffle 1527 to the baffle slots 1529, which is referred to as the mixing area 1503. After the combined flow 1501 passes through the micro-jets 1523, it passes into the timing chamber 1505 which is defined as the space between the perforated baffle 1525 and the slotted baffle 1527.

The slotted baffle 1527 has both an attaching end 1528 and an interior end 1530. The interior end 1530 is typically plugged to force the mixed flow 1533 into the mixer assembly 1507. The attaching end 1528 is typically attached to the main steam outlet 1537. The baffle slots 1529 are typically cut in the attaching end 1528 of the slotted baffle 1527. The direction of the combined flow 1501 in the timing chamber 1505 is substantially counter to the direction of the mixed flow 1533 in mixing area 1503. Once the combined flow 1501 has gone through the baffle slots 1529 it is then termed to be mixed flow 1533.

Located within the slotted baffle 1527 is a substantially cylindrical exit guide 1509 of smaller overall diameter than the slotted baffle 1527. The mixed flow 1533 is then directed to a mixer assembly 1507 which is located at or in the interior end 1535 of the exit guide 1509. The mixer assembly 1507 can be simply the end of the exit guide 1509 or alternatively be vanes mounted inside the exit guide 1509. However, the mixer assembly will typically be of the type illustrated in FIGS. 10, 11, or 12.

The mixed flow 1533 is then directed to a mixer assembly 1507 which can be either mounted on or in the interior end 1535 of the exit guide 1509. After passing through the mixer assembly 1507 the mixed steam 1533 is referred to as HP inlet mixed steam 130.

The HP inlet mixed steam 130 then exits the exit chamber 1511 into main steam piping 1513 at the main steam outlet 1537 where it is directed to the steam turbine 10. It is within the contemplation of the instant invention that a plurality of exit chambers 1511 can be utilized. Specifically, now referring to FIG. 18a, outlet steam 135 is extracted from the micro-jet mixer 105 and is used for conditioning within the MSR 50.

The embodiments illustrated in FIGS. 15a and 15b are with a single perforated baffle 1525 and a single slotted baffle 1527, however, multiple baffles 1525, or multiple baffles 1527, or any combination can be used as needed to increase the degree of mixing.

Figure 15C:
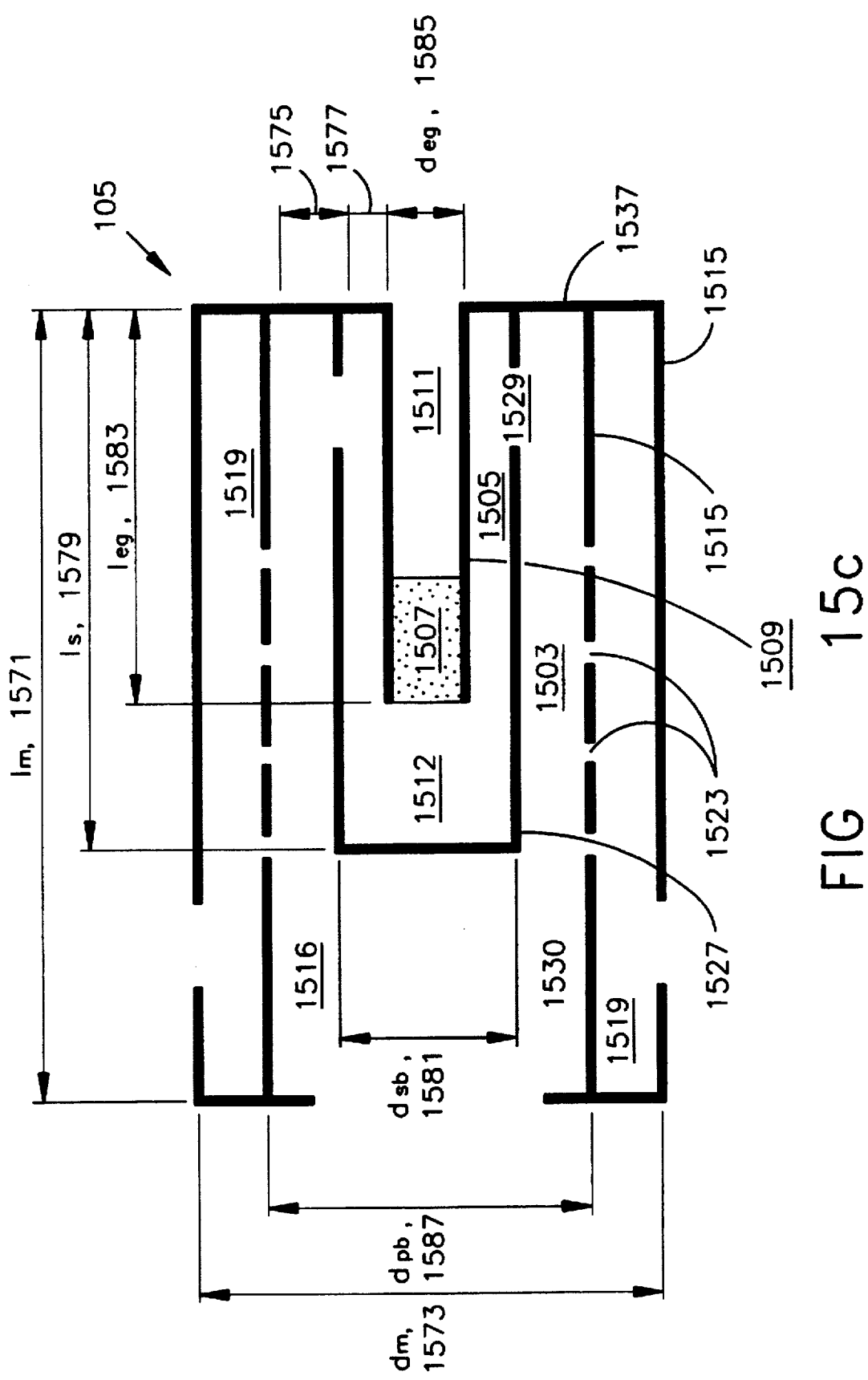
FIG. 15c: Is a longitudinal view of the micro-jet mixer through lines 16—16 that illustrates dimensions and volumes.
Figure 15D:
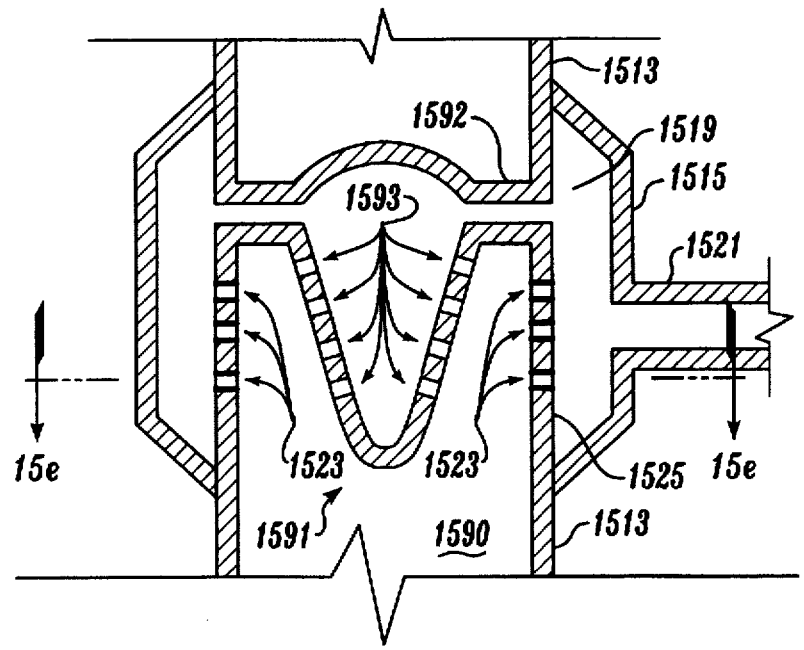
FIG. 15d: Is a longitudinal cross section of an alternative embodiment of the micro-jet mixer.
Figure 15E:
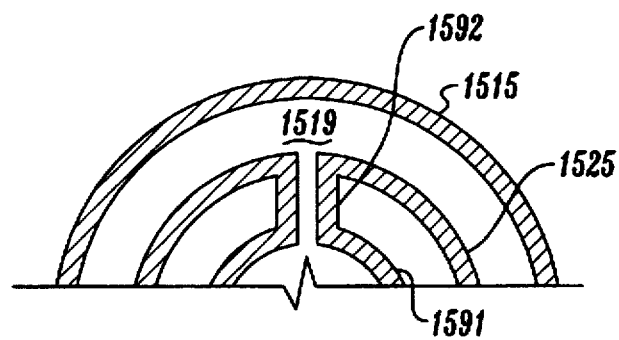
FIG. 15e: Is a sectional cross section of an alternative embodiment of the micro-jet mixer.

Alternatively, an embodiment as shown in FIG. 15d and 15e may be used. In this embodiment, high enthalpy steam enters the inlet 1521 into the annulus 1519 between the mixer shell 1515 and the perforated baffle 1525. The high enthalpy steam may then pass through a first set of micro-jets 1523 and mix with low quality steam in the chamber 1590. Further, high enthalpy steam may enter a second perforated baffle 1591 through passage(s) 1592. The high enthalpy steam then passes through a second set of micro-jets 1593 into the chamber 1590. The perforated baffle 1525 and the second perforated baffle 1591 may be used separately or together. When used together, greater mixing turbulence is achieved in the chamber 1590.

Thermal Differentials

Due to the temperature differentials expected, the perforated baffle 1525 should be mounted to the main steam inlet 1517 by means of a thermal expansion joint 1539. Thermal expansion joints are well known in the art, and will allow for expansion and contraction without damage of the components of the micro-jet mixer 105.

Slotted Baffle Construction

Figure 16:
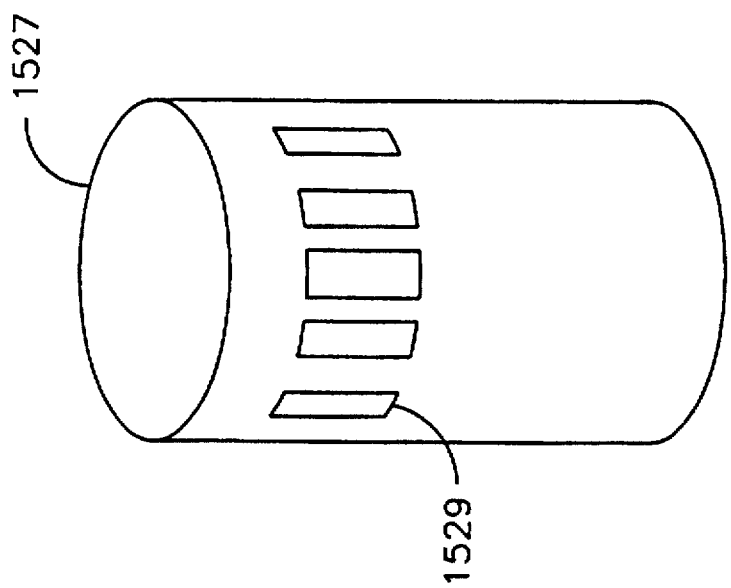
FIG. 16: Is an isometric view of the slotted baffle illustrating the baffle slots.

Now referring to FIG. 16 the slotted baffle 1527 will typically be a substantially cylindrical pipe into which is cut a plurality of baffle slots 1529. For use in a nuclear power steam plant the baffle slots 1529 should be approximately 5 cm wide and 20 cm long, and substantially uniformly distributed transversely around the exit end 1543 of the slotted baffle 1527. The baffle slots 1529 can also be ellipsoid in shape with the major axis being 12 cm and the minor axis being 6 cm in length. The density of the baffle slots 1529 is determined by the design limitations on pressure drop. The more baffle slots 1529 would cause a reduction in pressure differential across the slotted baffle 1527.

Perforated Baffle Construction

Figure 17B:
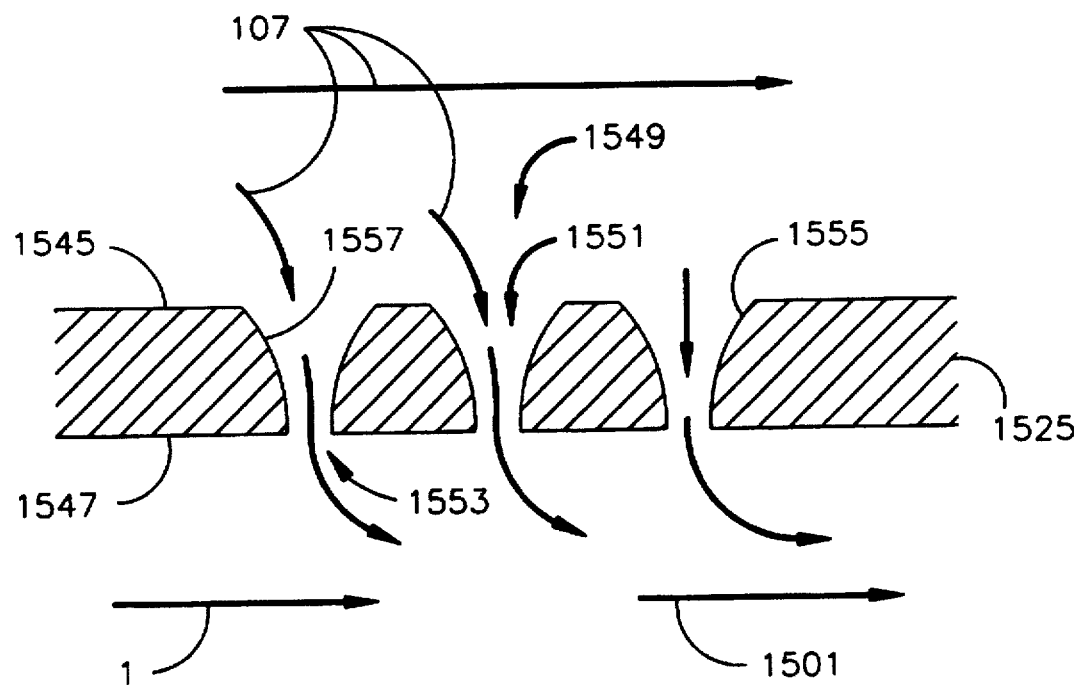
FIG. 17b: Is a longitudinal view of the perforated baffle wall illustrating the nozzle inlets and outlets.
Figure 17A:
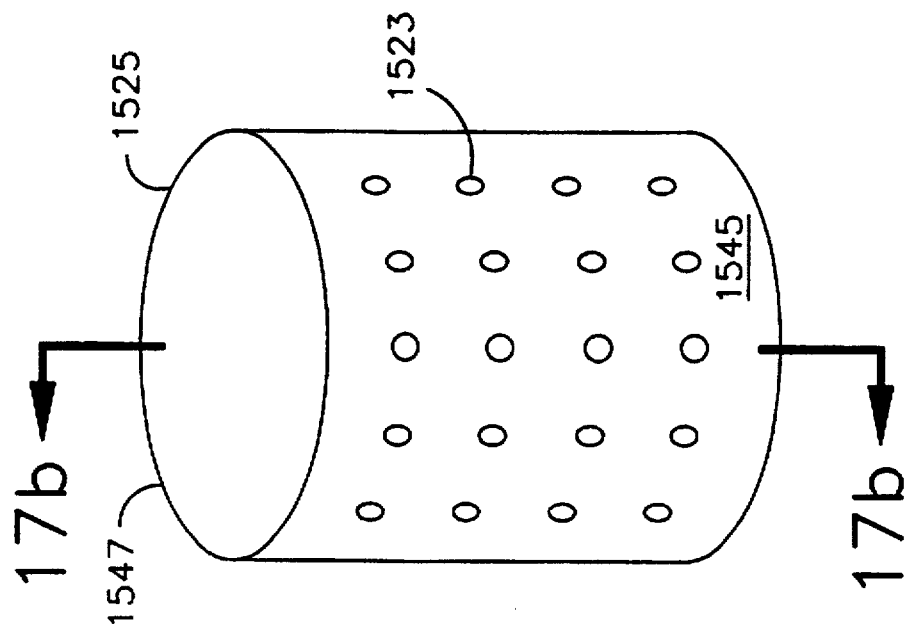
FIG. 17a: Is an isometric view of the perforated baffle illustrating the micro-jets.

Referring now to FIGS. 17a and 17b the perforated baffle 1525 is a substantially cylindrical into which is cut a plurality of micro-jets 1523. The micro-jets 1523 should be from 10 to 20 mm in diameter and substantially uniformly distributed over the entire surface of the perforated baffle. Or alternatively, the micro-jets 1523 can only be placed adjacent to the mixing area 1503. The density of the micro-jets 1523 is determined by the design limitations on pressure drop. The more micro-jets 1523 would cause a reduction in pressure differential across the perforated baffle 1525.

The microjets 1523 are orifices cut through the perforated baffle 1525 from the outer surface 1545 to the inner surface 1547. Additional control of the HRB outlet steam 107 velocity and pressure can be obtained by shaping the orifices as nozzles 1549. The nozzle configuration would be used in application where a lower pressure drop is required. Nozzles would typically have a larger inlet 1551 surface area than a outlet 1553 surface area. Other configurations for the orifices is also possible.

Examples of other possible orifice shapes include, rounded edges 1555, orifice walls 1557 can be concave, orifice walls 1557 can be convex, or where the orifice area on the outer surface 1545 is smaller than the orifice area on the inner surface 1547.

A possible added advantage of using particularly shaped orifices is that steam erosion of the surface would be less in more rounded walls 1557 and edges 1555.

Expected Equipment Sizes

Referring now to FIG. 15c, based upon a typical nuclear plant main steam line size of 0.8 meters the micro-jet mixer 105 described above is expected to be from 2.5 to 3 meters in length ($l_m$, 1571) and about 1.6 meters in diameter ($d_m$, 1573). This size estimate is also based upon the use of four HRB high pressure steam 107 steam lines feeding the mixer 105.

A mixer 105 of this size will have a perforated baffle 1525 of about 1.3 meters and a slotted baffle 1527 of about 1.1 meters in diameter. This implies a distance ($d_{sb-pb}$, 1575) between the slotted baffle 1527 and the perforated baffle 1525 of about 100 mm before any allowance is made for the thickness of the materials of construction. The exit guide 1509, is expected to be about 0.8 meters in diameter ($d_{eg}$, 1585), causing a distance ($d_{eg-sb}$, 1577) between the exit guide and the slotted baffle of about 150 mm.

ELIMINATION OF THE LPMS

Referring now to FIG. 18a, still another embodiment of the instant invention is the elimination of the requirement of a LPMS 140. In this embodiment the MSR discharge steam 137 is directed immediately into the LP stage 40. This is possible because the HPMS outlet steam 135 has high enough enthalpy before entering the MSR 50 such that the MSR discharge steam 137 entering the LP stage 40 is of sufficient quality and enthalpy to achieve the corrosion and erosion benefits discussed above, while having sufficient enthalpy to prevent the desired work in the LP Stage 40.

This increase in enthalpy is accomplished by means of a booster turbine 1801 in conjunction with the HRB 110 to treat, i.e. increase the enthalpy, of the HPMS outlet steam 135 prior to entering the HPMS 105. This is done by increasing the enthalpy of the HRB outlet steam 107. The enthalpy of the HRB outlet steam 107, which is at a high pressure, is increased by directing the HRB low pressure steam 145 to the booster inlet 1803 of the booster turbine 1801. The booster discharge steam (BDS) 1805 of the booster turbine 1801 is then directed to the HPMS 105 via the HRB 110. The pressure of the BDS 1805 is typically only higher than that of main steam 1 to facilitate mixing as discussed above. After leaving the HPMS 105 the 135 is directed to the MSR 50 thence directly to the LP stage 40.

The decrease in enthalpy of HRB low pressure steam 145 while in the booster turbine 1801 represents useful work and is used to produce electricity via generator 155. The shaft 1809 of the booster turbine will typically be mechanically connected to shaft 1811 of the gas turbine 125, but two shaft operation is also contemplated.

It should be noted that BDS 1805 is typically directly fed into the HPMS 105 within the HRB 110 where it is heated in a HRB tube assembly (not shown).

When the instant invention is operated in this mode it is the equivalent of using the booster turbine 1801 as a "high pressure stage", the HP stage 35 as a "medium stage", with the role of the LP stage 40 being unchanged.

It is within the contemplation of the practice of the instant invention that a multiplicity of booster turbines can be used to achieve higher enthalpy entering the micro-jet mixer 105 or LP stage 40 as desired.

HPMS OR MIXER-JET VIBRATIONAL CONSIDERATIONS

It is well known in the art that large mass flow rates of steam mixing at different temperatures and pressures can cause equipment vibration. In most embodiments of the instant invention vibrational characteristics of the system will have to be considered.

When an HPMS 105 is used, the sizing of the components of the HPMS 105 can reduce the vibrations that can be experienced. Referring again to FIG. 15c, a mixing length $l_m$ 1571 to micro-jet mixer diameter $d_m$ 1573 ratio of approximately 15 to 1 will have advantageous vibrational characteristics.

Similarly, the slotted baffle length $l_{sb}$ 1579 to slotted baffle diameter $d_{sb}$ 1581 can be adjusted to cause minimal vibration. Also, the exit guide length $l_{eg}$ 1583 to exit guide diameter $d_{eg}$ 1585 can be adjusted to achieve minimal vibration.

Any time the length/diameter ratio is adjusted, due consideration should be given to the resulting volume. Volume not only influences the pressure drop and change, due to friction or Bernoulli's effect respectively, but it is also important in allowing the desired mixing to take place.

For example, the volume $V_{oa}$ of the outer annulus 1509 which is determined by the micro-jet mixer diameter $d_m$ 1573, the micro-jet mixer length $l_m$ 1571, and diameter of the perforated baffle $d_{pb}$ 1587, and for a circular micro-jet mixer 105 can be expressed as $$V_{oa} = l_m * \pi * \frac{1}{4} * (d_m^2 - d_{pb}^2),$$

is an important consideration. As is the volume of the timing chamber 1505, exit chamber 1511, guide chamber 1512, and the inlet chamber 1516. Each of these volumes can be expressed using same method of calculation and is well know in the art.

USE OF THE LPMS WITH THE BOOSTER TURBINE

To provide maximum plant flexibility it may be desirable to be able to have both a LPMS 140 and a booster turbine 1801 installed. Referring now to FIG. 18b the LPMS 140 and the booster turbine 1801 can be used in conjunction with one another, or used alone, depending upon operational needs. In this embodiment the HRB high pressure steam 107 is directed to the booster turbine 1803 inlet where work is extracted as previously discussed.

In this embodiment steam will be extracted from the booster turbine 1801 in two ways. After work has been extracted the DBS 1805 will also be directed to the HRB 110. However, at mid-turbine 1813, extraction booster steam (EBS) 1815 will be extracted and directed to the HPMS 105.

The HRB low pressure steam 145 is directed to the LPMS 140 in order to increase the enthalpy of the LPMS discharge steam 150 to the desired level.

The EBS 1815 extracted from 1803 will be at a slightly higher pressure than main steam 1 and is directed to HPMS 105. From this point the flow is substantially the same as discussed above.

PIPING, EQUIPMENT, AND VALVE PERMUTATIONS

It is obvious to one skilled in the art that various combinations of the piping and equipment disclosed can be used. For example, all components and piping necessary for any embodiment can be installed. The use of valves will enable any specific embodiment to be achieved as desired.

OTHER EMBODIMENTS POSSIBLE

While several preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for improving the operational characteristics of a steam driven power system utilizing low quality steam, comprising the steps of:

(a) inserting a micro-jet mixer having a first inlet, second inlet and an outlet into a downstream portion of piping carrying the low quality steam from a steam generator, said micro-jet mixer further having a baffle located within the micro-jet mixer and having a pluality of micro-jets cut therein, said micro-jets extending through said baffle, said first inlet receiving said low quality steam on one side of said baffle; and (b) supplying high quality steam to said second inlet of said micro-jet mixer on an opposite side of said baffle, wherein (I) said high quality steam flows through said micro-jets mixing with said low quality steam causing said low quality steam to be superheated, thereby forming a high enthalpy mixed steam exiting said outlet of said micro-jet mixer.

2. The method as recited in claim 1, further comprising the step of:

(c) directing said mixed steam into a turbine of an electric power plant, wherein work is extracted by said turbine.

3. The method as recited in claim 2, further comprising the steps of:

(d) directing a turbine exhaust steam into a moisture separator reheater where said turbine exhaust steam is mixed with said mixed steam from said a micro-jet mixer wherein a moisture separator discharge steam is formed;

(e) directing said moisture discharge steam to a low pressure mixer superheater where it is mixed with low pressure steam forming low pressure mixer superheater discharge steam; and (f) directing said low pressure mixer superheater discharge steam into a low pressure stage of the turbine of said electric power generation plant;

whereby efficiency of said electric power generation plant is increased.

4. The method as recited in claim 2, further comprising the steps of:

(d) directing a turbine exhaust steam into a moisture separator reheater where said turbine exhaust steam is mixed with said mixed steam from said a micro-jet mixer wherein a moisture separator discharge steam is formed;

(e) directing said moisture separator reheater discharge steam into a low pressure stage of the main turbine of said nuclear power electric power generation plant;

whereby efficiency of said electric power generation plant is increased.

5. The method as recited in claim 1, wherein said steam driven power system is selected from the group consisting of nuclear, solar, fossil, and geothermal electric power plants, and water craft propulsion systems.

6. The method as recited in claim 1, wherein said high quality steam is selected from the group consisting of exhaust from a gas turbine, steam from a heat recovery boiler heated by gas turbine exhaust, discharge from an extraction booster turbine or a combination thereof.

7. An apparatus for improving the operational characteristics of a steam driven power system utilizing low quality steam, comprising:

(a) a micro-jet mixer having a first inlet, second inlet and an outlet mounted into a downstream portion of piping carrying the low quality steam from a steam generator, said micro-jet mixer further having a baffle located within the micro-jet mixer and having a pluality of micro-jets cut therein, said micro-jets extending through said baffle, said first inlet receiving said low quality steam on one side of said baffle, said second inlet receiving high quality steam on an opposite side of said baffle, wherein said high quality steam flows through said micro-lets and is mixed with said low quality steam causing said low quality steam to be superheated, thereby forming a high enthalpy mixed steam exiting said outlet of said micro-jet mixer, said high pressure mixed steam directed to turbine wherein work is extracted.

8. The apparatus as recited in claim 7, wherein said high quality steam is selected from the group consisting of steam from a heat recovery boiler heated by gas turbine exhaust, discharge from an extraction booster turbine or a combination thereof.

9. The apparatus as recited in claim 8, further comprising:

(a) a moisture separator reheater wherein a turbine exhaust steam is mixed with said mixed steam from said micro-jet mixer wherein a moisture separator discharge steam is formed;

(b) a low pressure mixer superheater wherein said moisture discharge steam is mixed with low pressure steam forming low pressure mixer superheater discharge steam; and (c) a low pressure stage turbine wherein said low pressure mixer superheater discharge steam is directed.

10. The apparatus as recited in claim 8, further comprising:

(a) a moisture separator reheater wherein a turbine exhaust steam is mixed with said mixed steam from said micro-jet mixer wherein a moisture separator discharge steam is formed;

(b) a low pressure stage turbine wherein said low pressure mixer superheater discharge steam is directed.

11. The apparatus as recited in claim 7, wherein said steam driven power system is selected from the group consisting of nuclear, solar, fossil and geothermal electric power plants, and water craft propulsion.

12. The apparatus as recited in claim 7, wherein said high quality steam is selected from the group consisting of steam from a heat recovery boiler heated by gas turbine exhaust, discharge from an extraction booster turbine or a combination thereof.

13. The apparatus as recited in claim 7, further comprising:

(c) a slotted baffle located within said baffle and having a interior end and an attaching end, (i) said attaching end attached to said outlet, and having a plurality of baffle slots cut therein for receiving said combined flow, and (ii) said combined flow flowing through said baffle slots, thereby forming a mixed flow.

14. The apparatus as recited in claim 13, further comprising:

(d) an exit chamber located within said slotted baffle having a mixer end, a discharge end, and a chamber region, said mixed flow directed to said mixer end thereby forming a high enthalpy mixed steam, which is directed to said outlet and to a high pressure inlet of said turbine.

15. The apparatus in claim 13 having a plurality of slotted baffles.

16. The apparatus in claim 7 having a plurality of baffles.

17. The apparatus in claim 14 wherein a plurality of exit chambers are used.

18. The apparatus in claim 14 wherein the mixer end of the exit chamber comprises a mixer assembly.

19. The apparatus in claim 18 wherein said mixer assembly is constructed of honeycomb mixing material.

20. The apparatus in claim 18 wherein the mixer assembly is a vortex mixer.

21. The apparatus in claim 18 wherein the microjets have a diameter from 10–20 mm.

22. The apparatus in claim 7, wherein the micro-jets are nozzle shaped with a nozzle inlet and a nozzle outlet.

23. The apparatus in claim 22 wherein the nozzle inlet is larger than the nozzle outlet.

24. The method in claim 3 wherein high pressure stage exhaust steam is mixed with a heat recovery boiler high pressure steam to form the low pressure mixer superheater discharge steam.

25. The method in claim 3 wherein high pressure stage exhaust steam is mixed with heat recovery boiler low pressure steam to form the low pressure mixer superheater discharge steam.

* * * * *

UNITED STATES PATENT AND TRADEMARK OFFICE
CERTIFICATE OF CORRECTION

PATENT NO. : 5,793,831
DATED : August 11, 1998
INVENTOR(S) : Tsiklauri, et. al.

It is certified that error appears in the above-identified patent and that said Letters Patent is hereby corrected as shown below:

In column 19, line 16, replace "claim 18" with -- claim 7--.

In column 18, line 9, replace "micro-lets" with --micro-jets--.

Signed and Sealed this

Thirtieth Day of May, 2000

Attest:

Q. TODD DICKINSON

Attesting Officer

Director of Patents and Trademarks